(12) United States Patent
Shimoda et al.

(10) Patent No.: US 11,650,548 B2
(45) Date of Patent: May 16, 2023

(54) TIMEPIECE

(71) Applicant: CITIZEN WATCH CO., LTD., Tokyo (JP)

(72) Inventors: Kenji Shimoda, Tokyo (JP); Yasuo Kitajima, Sayama (JP); Daisuke Tokunaga, Nishitokyo (JP); Shinnosuke Sakata, Higashikurume (JP); Koki Mine, Kiyose (JP); Yuta Furudate, Iruma (JP); Kazutaka Igarashi, Kodaira (JP)

(73) Assignee: CITIZEN WATCH CO., LTD., Tokyo (JP)

(*) Notice: Subject to any disclaimer, the term of this patent is extended or adjusted under 35 U.S.C. 154(b) by 579 days.

(21) Appl. No.: 16/816,242

(22) Filed: Mar. 11, 2020

(65) Prior Publication Data
US 2020/0293000 A1    Sep. 17, 2020

(30) Foreign Application Priority Data

Mar. 13, 2019 (JP) .............................. JP2019-046241
Feb. 13, 2020 (JP) .............................. JP2020-022176

(51) Int. Cl.
*G04C 3/10*    (2006.01)
*G04C 5/00*    (2006.01)
*H01G 7/02*    (2006.01)

(52) U.S. Cl.
CPC ............. *G04C 5/005* (2013.01); *G04C 3/101* (2013.01); *H01G 7/025* (2013.01)

(58) Field of Classification Search
CPC . G04G 19/00; G04C 5/00; G04C 1/02; G04C 5/005; G04C 3/101; G04C 3/10; H01G 7/025
See application file for complete search history.

(56) References Cited

U.S. PATENT DOCUMENTS

| | | | |
|---|---|---|---|
| 3,696,258 A * | 10/1972 | Anderson | H02N 1/004 55/DIG. 39 |
| 2014/0085154 A1 * | 3/2014 | Nagahama | G01S 19/14 343/720 |
| 2016/0004223 A1 * | 1/2016 | Willemin | G04C 1/028 368/207 |

(Continued)

FOREIGN PATENT DOCUMENTS

JP    2013-059149 A    3/2013

*Primary Examiner* — Sean Kayes
(74) *Attorney, Agent, or Firm* — HEA Law PLLC

(57) ABSTRACT

Provided is a watch, including: an exterior case having electroconductivity; an operating member having electroconductivity, which is inserted into the exterior case through an opening formed through the exterior case, and which is configured to accept an operation performed by a user; and an electrostatic motor including: an electret substrate having an electret surface on which electret films being electrically charged are provided; a counter substrate, on which electrodes to be arranged so as to be opposed to the electret films are provided; and a rotary shaft configured to rotate the electret substrate and the counter substrate relative to each other, wherein the operating member and the exterior case are electrically continuous with each other via a conduction path formed so as to avoid overlapping with the electret surface in plan view.

17 Claims, 19 Drawing Sheets

(56) References Cited

U.S. PATENT DOCUMENTS

| | | | |
|---|---|---|---|
| 2016/0170377 A1* | 6/2016 | Hamatani | F03G 1/10 |
| | | | 368/204 |
| 2017/0019035 A1* | 1/2017 | Matsumoto | G04C 10/00 |
| 2017/0269557 A1* | 9/2017 | Ihara | G04C 10/02 |

* cited by examiner

TIMEPIECE

CROSS-REFERENCE TO RELATED APPLICATION

The present disclosure contains subject matter related to that disclosed in Japanese Patent Application JP 2019-046241 filed in the Japan Patent Office on Mar. 13, 2019, and Japanese Patent Application JP2020-022176 filed in the Japan Patent Office on Feb. 13, 2020, the entire contents of which are hereby incorporated by reference.

BACKGROUND OF THE INVENTION

1. Field of the Invention

The present invention relates to a timepiece including electrostatic induction type converters.

2. Description of the Related Art

In Japanese Patent Application Laid-Open No. 2013-59149, there is disclosed a watch including an electrostatic induction type converter. The electrostatic induction type converter includes substrates. Electret films being electrically charged are provided on one of the substrates. Electrodes are arranged on another one of the substrates so as to be opposed to the electret films. It is known that the electrostatic induction type converter is used as an electric power generating device or a driving device.

When a user operates a crown, static electricity, which is generated by contact of a user's finger with the crown, may flow into the watch. In the electrostatic induction type converter described above, there may arise a risk that a charging voltage of an electret substrate may be affected by the static electricity flowing into the watch from outside to cause malfunction. In particular, when the electrostatic induction type converter is used as a motor configured to drive hands, malfunction of the electrostatic induction type converter may lead to impairment of an original function of the watch, specifically, indication of time.

The present invention has been made in view of the problems described above and has an object to provide a timepiece including an electrostatic induction type converter, with which an influence of static electricity flowing into the watch from outside is suppressed.

SUMMARY OF THE INVENTION

The invention disclosed in this application to achieve the above-mentioned object has various aspects, and the representative aspects are outlined as follows.

(1) A timepiece, including: an exterior case having electroconductivity; an operating member having electroconductivity, which is inserted into the exterior case through an opening formed through the exterior case, and which is configured to accept an operation performed by a user; an electrostatic induction type converter including: an electret substrate having an electret surface on which electret films being electrically charged are provided; a counter substrate, on which electrodes to be arranged so as to be opposed to the electret films are provided; and a rotary shaft configured to rotate the electret substrate and the counter substrate relative to each other; and a battery, wherein the operating member and the exterior case are electrically continuous with each other via a conduction path formed so as to avoid overlapping with the electret surface in a plan view.

(2) The timepiece according to Item (1), further including: a clock circuit board on which a control circuit having a time measurement function is mounted; and a conductive member configured to allow conduction between the clock circuit board and the exterior case.

(3) The timepiece according to Item (2), wherein the conduction path passes through the clock circuit board, and wherein the clock circuit board is arranged so as to avoid overlapping with the electret surface in the plan view.

(4) The timepiece according to Item (2), further including a member, which is provided on a part of the conduction path, which allows conduction between the operating member and the clock circuit board, and has a posture to be displaced along with the operation of the operation member, which is performed by a user, wherein the member is arranged so as to avoid overlapping with the electret surface in the plan view.

(5) The timepiece according to Item (2), wherein the clock circuit board has a cutout formed so as to avoid covering the electret surface in the plan view.

(6) The timepiece according to Item (1), further including a wheel train configured to operate in association with a member having a posture to be displaced in accordance with an operation of the operation member, wherein the wheel train is arranged so as to avoid overlapping with the electret surface in the plan view.

(7) The timepiece according to Item (1), wherein the battery is arranged so as to avoid overlapping with the electret surface in the plan view.

(8) The timepiece according to Item (7), wherein the rotary shaft and the battery are respectively arranged in different regions among four regions defined by a first straight line for connecting a twelve o'clock position and a six o'clock position and a second straight line for connecting a three o'clock position and a nine o'clock position in the plan view.

(9) The timepiece according to Item (1), wherein the electrostatic induction type converter includes a plurality of electrostatic induction type converters, and wherein at least the rotary shafts of the plurality of electrostatic induction type converters are respectively arranged in different regions among four regions defined by a first straight line for connecting a twelve o'clock position and a six o'clock position and a second straight line for connecting a three o'clock position and a nine o'clock position in the plan view.

(10) The timepiece according to Item (1), wherein the electrostatic induction type converter comprises a driving device.

(11) The timepiece according to Item (10), wherein the electrostatic induction type converter includes a plurality of electrostatic induction type converters, which include at least two electric power generating devices, and wherein at least the rotary shaft of the driving device and the rotary shafts of the electric power generating devices are respectively arranged in different regions among four regions defined by a first straight line for connecting a twelve o'clock position and a six o'clock position and a second straight line for connecting a three o'clock position and a nine o'clock position in the plan view.

(12) The timepiece according to Item (11), further including: an oscillating weight configured to be rotated in accordance with a posture of the watch and transmit a rotation amount of the oscillating weight to the electret substrate of each of the electric power generating devices; and a conductive member, which is arranged so as to avoid overlapping with an oscillation locus of the oscillating weight in the plan view and is electrically continuous with the exterior case on the conduction path.

(13) The timepiece according to Item (10), wherein the operating member and the rotary shaft of the driving device are respectively arranged in two different regions defined by a straight line for connecting a twelve o'clock position and a six o'clock position.

(14) The timepiece according to Item (10), further including a hand, wherein the driving device is configured to move the hand.

(15) The timepiece according to Item (14), further including an electromagnetic motor, wherein the hand comprises at least a second hand, a minute hand, and an hour hand, wherein the electromagnetic motor is configured to move the minute hand and the hour hand, and wherein the driving device is configured to move the second hand.

(16) The timepiece according to Item (15), wherein the electromagnetic motor includes a coil, and wherein the coil is arranged so as to avoid overlapping with the electret surface of the driving device in the plan view.

(17) The timepiece according to Item (15), wherein a shortest distance between the driving device and the battery is larger than a shortest distance between the electromagnetic motor and the battery in the plan view.

(18) The timepiece according to Item (1), wherein the exterior case includes a case body and a case back, and wherein the operating member is electrically continuous with the case back via the conduction path.

(19) The timepiece according to Item (1), further including a main plate on which a clock circuit board assembled with a control circuit having a time measurement function is mounted, a member having a posture to be displaced along with the operation of the operation member, which is performed by a user, a positioning pin that supports the member so as to be rocked, and a positioning member that positions the main plate with respect to the exterior case, wherein the conduction path passes through the member, the positioning pin, the main plate, and the positioning member.

(20) The timepiece according to Item (19), wherein the member is arranged so as to avoid overlapping with the electret surface in the plan view.

DETAILED DESCRIPTION OF THE INVENTION

A description is made below in detail of an embodiment of the present invention based on the drawings.

Figure 1:
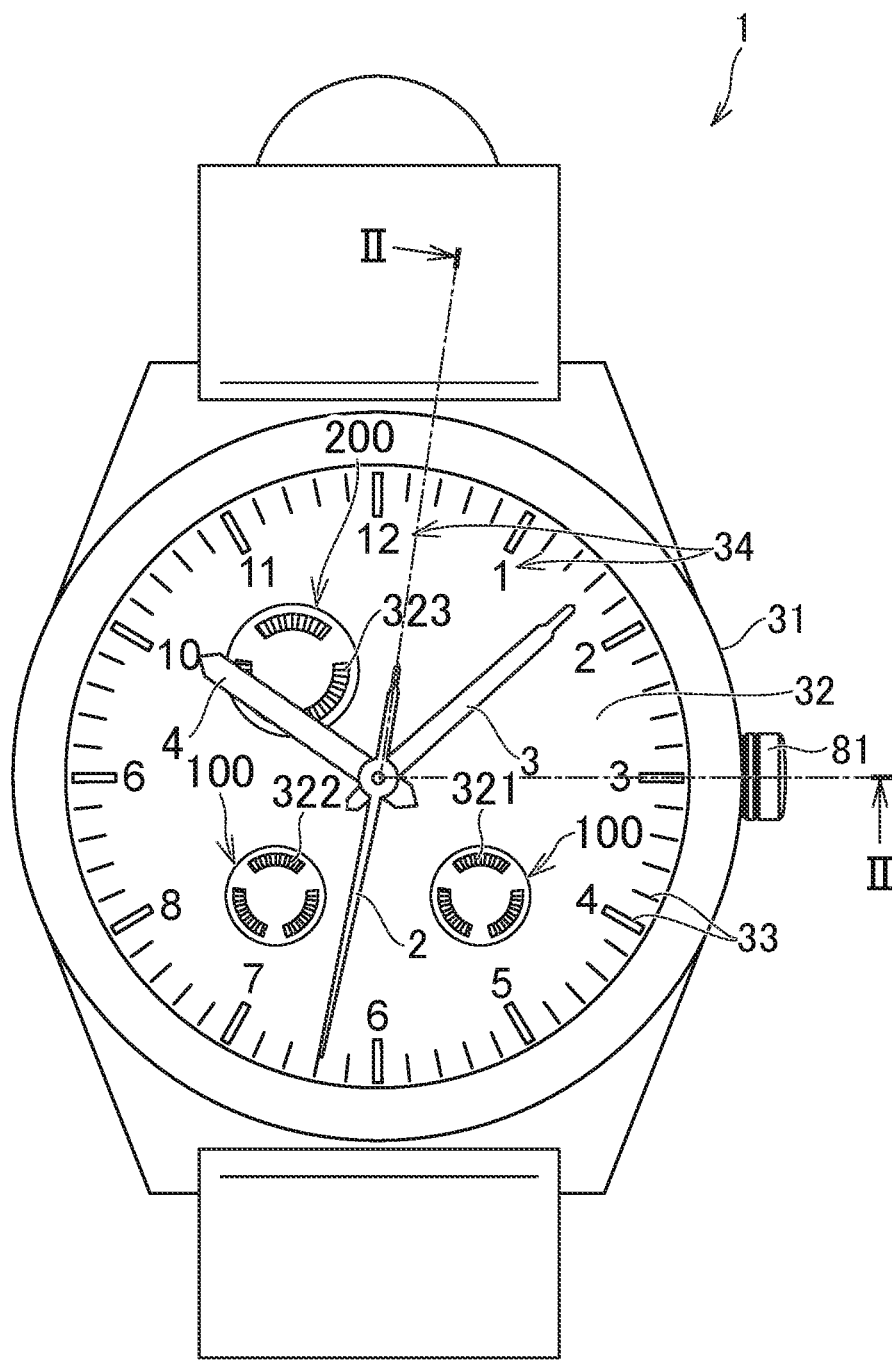
FIG. 1 is a plan view for illustrating an outline of an overall configuration of a watch according to an embodiment of the present invention.
Figure 2:
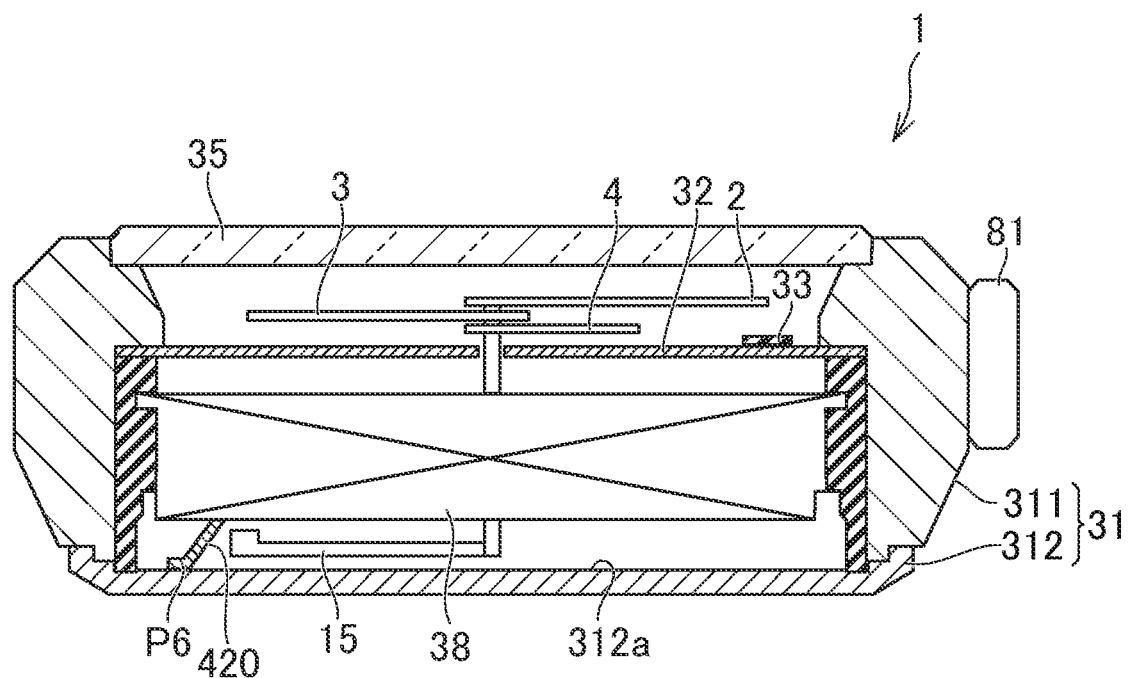
FIG. 2 is a sectional view for illustrating a cross section taken along the line II-II of FIG. 1.
Figure 3:
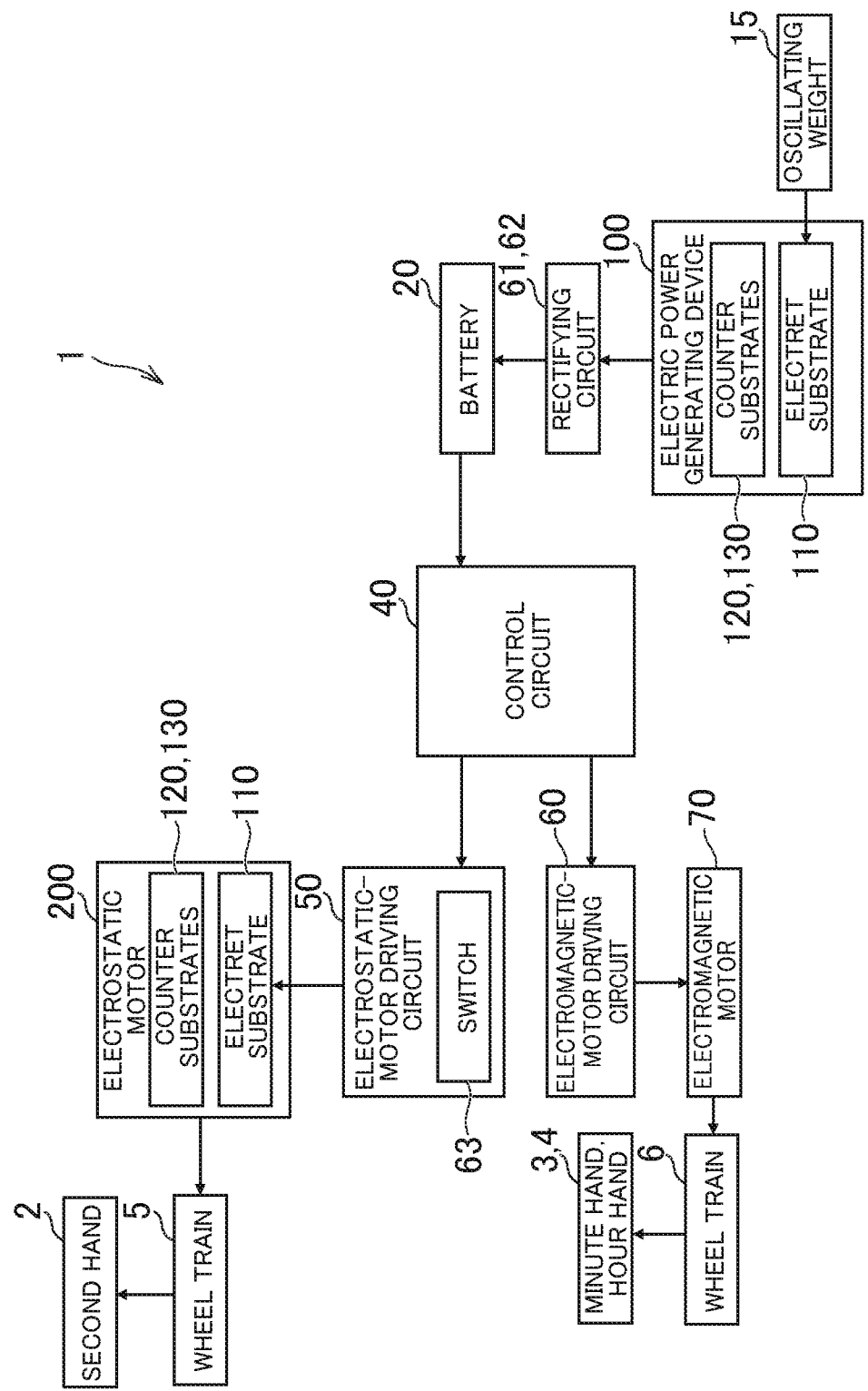
FIG. 3 is a block diagram for illustrating an outline of a configuration of the watch according to the embodiment of the present invention.

First, with reference to FIG. 1 to FIG. 3, an outline of an overall configuration of a watch according to an embodiment of the present invention is described. FIG. 1 is a plan view for illustrating an outline of an overall configuration of the watch according to the embodiment of the present invention. FIG. 2 is a sectional view for illustrating a cross section taken along the line II-II of FIG. 1. FIG. 3 is a block diagram for illustrating an outline of a configuration of the watch according to the embodiment of the present invention.

FIG. 2 is an illustration of the cross section taken along the line passing through a crown 81 and a ground spring 420. Further, in FIG. 2, for easy understanding of arrangement of hands, there is illustrated the cross section when a second hand 2, a minute hand 3, and an hour hand 4 are located on the line II-II.

A watch 1 includes, as illustrated in FIG. 1 and FIG. 2, an exterior case 31, a dial 32, the second hand 2, the minute hand 3, and the hour hand 4. The exterior case 31 includes a case body 311 and a case back 312. The dial 32 is arranged inside the exterior case 31. The second hand 2, the minute hand 3, and the hour hand 4 are hands configured to indicate time. Indices 33 and hour markers 34 are provided on the dial 32. Further, the crown 81 configured to allow a user to perform various operations is arranged on a three o'clock side of a side surface of the exterior case 31.

The crown 81 is configured to accept an operation performed by the user. When the user operates the crown 81, for example, turns the crown 81, or pushes or pulls out the crown 81, time correction can be performed or various functions of the watch 1 can be fulfilled.

It is preferred that the exterior case 31 be formed of a member having electroconductivity. More specifically, it is preferred that the case body 311 and the case back 312, which form the exterior case 31, be made of a metal such as stainless used steel (SUS) or a titanium alloy.

The design of the watch 1 which is illustrated in FIG. 1 is an example. Besides the design illustrated in FIG. 1, for example, the exterior case 31 may have a rectangular shape instead of a circular shape, or a suitable number of buttons may be provided in a suitable arrangement. Further, in FIG. 1, three hands, specifically, the second hand 2, the minute hand 3, and the hour hand 4 are provided. However, the number and kinds of hands are not limited thereto. For example, hands for indicating various types of information such as day of week, a time zone, ON/OFF of summer time, a radio-wave reception state, and a remaining battery level, and a date indication may be additionally provided.

As illustrated in FIG. 2, the watch 1 includes a watch glass 35, which is made of a transparent material such as glass and is formed so as to cover the dial 32. The watch glass 35 is mounted to the case body 311. Further, on a side opposite to the watch glass 35, the case back 312 is mounted to the case body 311. In the present application, a side on which the watch glass 35 is arranged (surface side on the drawing sheet of FIG. 1, specifically, upper side on the drawing sheet of FIG. 2) is hereinafter referred to as "front side", and a side on which the case back 312 is arranged (side opposite to the surface side of the drawing sheet of FIG. 1, specifically, lower side on the drawing sheet of FIG. 2) is hereinafter referred to as "back side". Further, a surface of each of structures on the front side is referred to as "front surface", and a surface of each of the structures on the back side is referred to as "back surface".

As illustrated in FIG. 2, the watch 1 further includes a movement 38 serving as a power mechanism. The movement 38 is provided on the back side of the dial 32. The movement 38 includes, for example, a wheel train, a motor, and a clock circuit board 413 (see FIG. 15), which are integrally assembled to a frame referred to as "main plate 411" (see, for example, FIG. 9). The wheel train and the motor are configured to drive the hands. On the clock circuit board 413, a control circuit 40 (see FIG. 3), which has a time measurement function, is mounted.

Further, the watch 1 includes the ground spring 420, which is a conductive member extending from the movement 38 toward the case back 312. The ground spring 420 is held in contact with an inner surface 312a of the case back 312 under an elastically deformed state, and allows conduction between the movement 38 and the case back 312. More specifically, the ground spring 420 allows conduction between the clock circuit board 413, which is assembled into the movement 38, and the case back 312. Details of the conduction between the members and conduction paths thereof are described later.

The ground spring 420 is provided so as to be maintained in a contact state with the inner surface 312a of the case back 312 with a reaction force of an elastic force of the ground spring 420. The inner surface 312a of the case back 312 is a surface of the case back 312, which is opposed to the movement 38 inside the watch 1.

In FIG. 2, a flat spring made of a metal is illustrated as the ground spring 420, which is a conductive member. However, the ground spring 420 is not limited thereto. Any conductive member may be used as long as a contact state with the inner surface 312a of the case back 312 is maintained, specifically, a conductive state with the case back 312 is maintained. For example, the conductive member may be a spring made of a metal, which is held in elastic contact with the inner surface 312a of the case back 312.

Further, as illustrated in FIG. 3, the watch 1 includes an electric power generating device 100, a battery 20, the control circuit 40, an electrostatic-motor driving circuit 50, an electrostatic motor 200, an electromagnetic-motor driving circuit 60, and an electromagnetic motor (stepper motor) 70. The electric power generating devices 100 is an electrostatic induction type electric power generating device, and the electrostatic motor 200 is an electrostatic induction type driving device. All the above-mentioned devices and circuits are assembled onto the main plate 411 illustrated in, for example, FIG. 10, which is referred to later.

The control circuit 40 is a microcomputer including, for example, a memory, which is built therein. The control circuit 40 is configured to control operations of, for example, various circuits included in the watch 1 in accordance with programs stored in the memory. An operation of the electrostatic-motor driving circuit 50 is controlled by the control circuit 40, and the electrostatic-motor driving circuit 50 drives the electrostatic motor 200 under the control by the control circuit 40. The electrostatic motor 200 is configured to move the second hand 2 through intermediation of a wheel train 5. An operation of the electromagnetic-motor driving circuit 60 is controlled by the control circuit 40, and the electromagnetic-motor driving circuit 60 drives the electromagnetic motor 70 under the control by the control circuit 40. The electromagnetic motor 70 is configured to move the minute hand 3 and the hour hand 4 through intermediation of a wheel train 6.

In this case, the second hand 2 is used not only as a time hand indicating time but also as an indicator hand in some cases. The indicator hand is configured to indicate various types of information such as day of week, a time zone, ON/OFF of summer time, a radio-wave reception state, and a remaining battery level. Even when the second hand 2 is used as an indicator hand, the minute hand 3 and the hour hand 4 function as time hands. Thus, it is preferred that the secondhand 2 be configured to be moved through intermediation of a motor and a wheel train, which are different from those used to move the minute hand 3 and the hour hand 4, so as not to be moved in association with the minute hand 3 and the hour hand 4. Further, the electrostatic motor 200 is preferred as a motor configured to continuously and smoothly move the hand, and the electromagnetic motor 70 is preferred as a motor configured to move the hand in a stepping manner. Thus, in this embodiment, as illustrated in FIG. 2, there is adopted a configuration in which the second hand 2 is moved by the electrostatic motor 200 and the minute hand 3 and the hour hand 4 are moved by the electromagnetic motor 70. However, a plurality of electrostatic motors 200 may be provided so that the minute hand 3 and the hour hand 4 are also moved by the electrostatic motor 200.

It is preferred that the battery 20 be a secondary battery to be driven with electrical energy, which is generated by the electric power generating device 100 and rectified by rectifying circuits 61 and 62. The electric power generating device 100 is dispensable. When the watch 1 does not include the electric power generating device 100, the battery 20 may be a primary battery.

Further, the electric power generating device 100 includes an electret substrate 110 and counter substrates 120 and 130. Further, the electrostatic motor 200 includes an electret substrate 110 and counter substrates 120 and 130.

Besides the configurations illustrated in FIG. 3, the watch 1 may include, for example, a constant-voltage source configured to supply a constant voltage as an output voltage from the battery 20 or a booster circuit configured to drive the electrostatic-motor driving circuit 50 at a low voltage.

Figure 4:
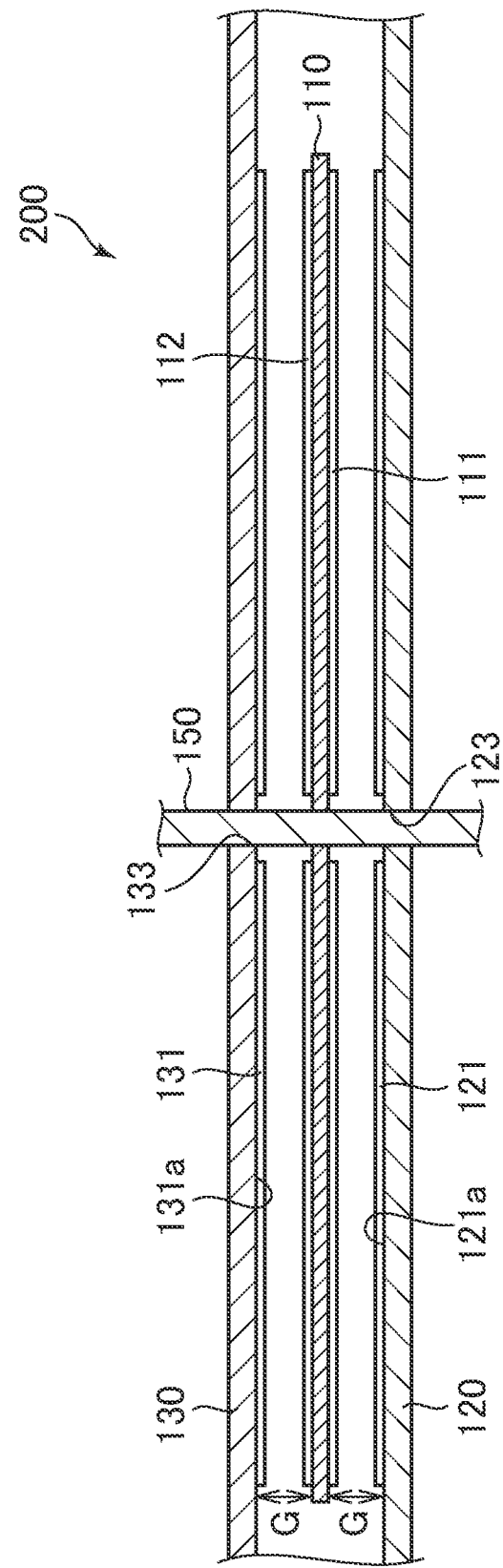
FIG. 4 is a schematic view for illustrating an electrostatic induction type converter according to the embodiment of the present invention.
Figure 5:
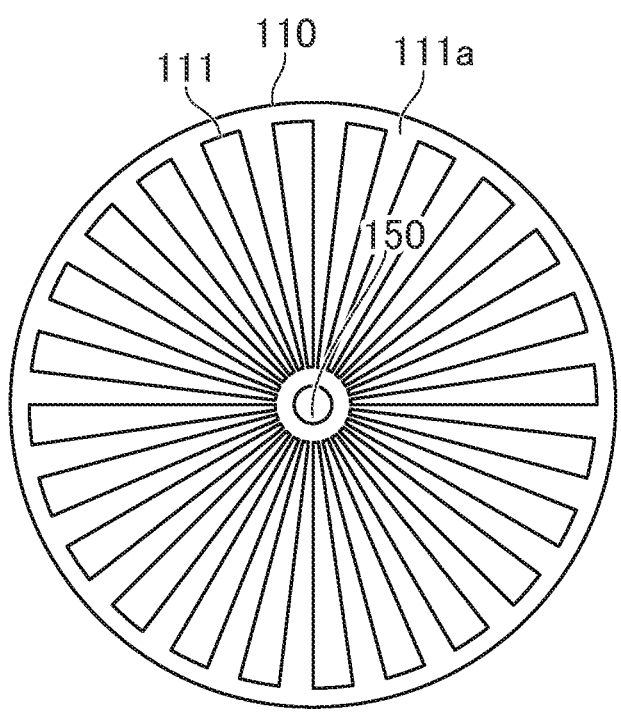
FIG. 5 is a plan view for illustrating an electret substrate according to the embodiment of the present invention.
Figure 6:
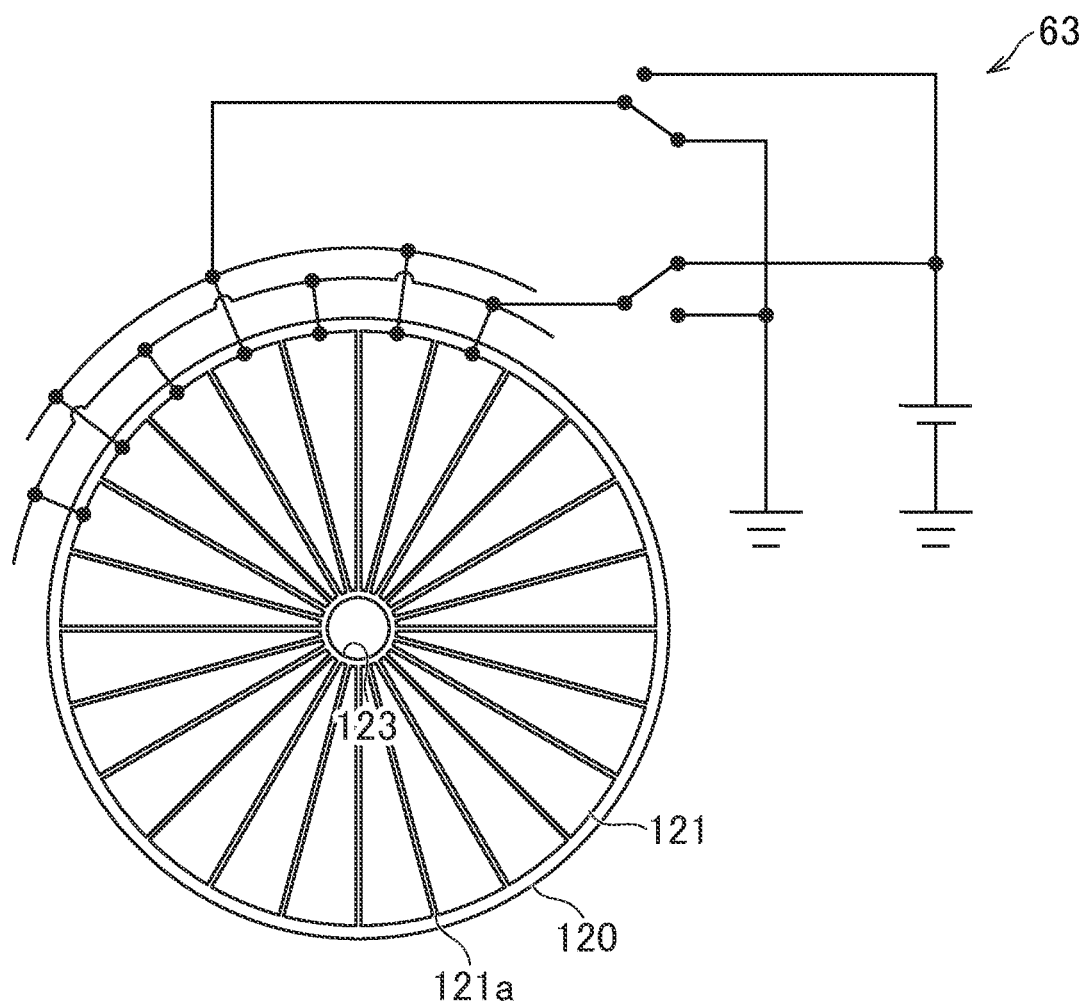
FIG. 6 is a plan view for illustrating one of counter substrates according to the embodiment of the present invention.

Next, with reference to FIG. 4 to FIG. 8, an electrostatic induction type converter according to this embodiment is described. FIG. 4 is a schematic view for illustrating the electrostatic induction type converter according to this embodiment. FIG. 5 is a plan view for illustrating the electret substrate according to this embodiment. FIG. 6 is a plan view for illustrating one of the counter substrates according to this embodiment. In FIG. 6, there is illustrated the counter substrate when the electrostatic induction type converter is used as a driving device.

In this case, the electrostatic induction type converter represents a device configured to perform mutual conversion between kinetic energy and electrical energy with use of electrostatic induction, and includes an electrostatic induction type electric power generating device and an electrostatic induction type driving device. The principle of the electrostatic induction type converter is described later. When an external force is exerted on the electrostatic induction type converter to provide kinetic energy to the electrostatic induction type converter, the kinetic energy is converted into electrical energy, and the electrical energy can be extracted. In this case, the electrostatic induction type converter functions as an electric power generating device. Further, when electrical energy is provided to the electrostatic induction type converter, the electrical energy can be extracted as kinetic energy. In this case, the electrostatic induction type converter functions as a driving device. In this embodiment, the electric power generating device 100 corresponds to the electrostatic induction type electric power generating device, and the electrostatic motor 200 corresponds to the electrostatic induction type driving device.

The electrostatic induction type converter converts a mechanical rotary motion into electrical energy or extracts electrical energy as a mechanical rotary motion. Now, a basic structure of the electrostatic motor 200 is described. A basic structure of the electric power generating device 100 is the same as that of the electrostatic motor 200, and thus the description thereof is herein omitted.

The electrostatic motor 200 includes the electret substrate 110, the counter substrate 120, the counter substrate 130, and a rotary shaft 150. It is preferred that each of the electret substrate 110 and the rotary shaft 150 be made of a metal. It is preferred that the rotary shaft 150 be provided so that an axis thereof is oriented in a direction of passing through the case back 312. Further, it is preferred that the electret substrate 110 and the counter substrates 120 and 130 be arranged so as to be substantially parallel to the inner surface 312a of the case back 312.

The electret substrate 110 has a disc-like shape. The electret substrate 110 includes electret films 111 provided on one of surfaces and electret films 112 provided on another one of the surfaces. The surfaces of the electret substrate 110 on which the electret films 111 and 112 are provided are hereinafter referred to as "electret surface 111a" and "electret surface 112a", respectively. In this case, the term "disc-like shape" means that a member has a substantially flat disc-like shape as a whole. The member having the disc-like shape may have a surface having a suitable through hole formed therein or an outer peripheral portion, which has a cutout or a projecting portion or has been subjected to other processing.

As illustrated in FIG. 5, a plurality of electret films 111 are provided so as to be spaced apart from each other in a circumferential direction of the electret substrate 110. Although not shown, a plurality of electret films 112 are also provided so as to be spaced apart from each other in the circumferential direction of the electret substrate 110.

In this case, as a material of the electret films 111 and 112, a material that becomes easily electrically charged is used. For example, as a material that can be negatively electrically charged, there are given silicon oxide and a fluororesin. As a specific example of the material that can be negatively electrically charged, there is given CYTOP (trademark), which is a fluororesin manufactured by AGC Inc. (formerly Asahi Glass Co., Ltd.). Besides, examples of the material of the electret films which can be used include polymer materials such as polypropylene, polyethylene terephthalate, polyvinyl chloride, polystyrene, polytetrafluoroethylene, polyvinylidene difluoride, and polyvinyl fluoride, and inorganic materials such as silicon oxide described above, silicon nitride, and silicon oxynitride.

In the electrostatic motor 200, the rotary shaft 150 is rotated along with rotation of the electret substrate 110. Meanwhile, in the electric power generating device 100, the electret substrate 110 is rotated along with the rotation of the rotary shaft 150.

The counter substrate 120 has a disc-like shape, and counter electrodes 121 are provided on a surface of the counter substrate 120, which is opposed to the electret surface 111a of the electret substrate 110. The surface of the counter substrate 120, on which the counter electrodes 121 are provided and which is opposed to the electret surface 111a, is hereinafter referred to as "electrode surface 121a". As illustrated in FIG. 6, a plurality of counter electrodes 121 are arranged so as to be spaced apart from each other in a circumferential direction of the counter substrate 120. Further, the counter substrate 120 has a shaft hole 123 at the center thereof. The rotary shaft 150 is inserted through the shaft hole 123. The rotary shaft 150 is not fixed with respect to the counter substrate 120, and idly rotates with respect to the counter substrate 120.

Although not shown, the counter substrate 130 has the same configuration as that of the counter substrate 120. Specifically, the counter substrate 130 has a disc-like shape, and counter electrodes 131 are provided on a surface of the electret substrate 110, which is opposed to the electret surface 112a. The surface of the counter substrate 130, on which the counter electrodes 131 are provided and which is arranged so as to be opposed to the electret surface 112a, is hereinafter referred to as "electrode surface 131a". Further, the counter substrate 130 has a shaft hole 133 through which the rotary shaft 150 is to be inserted. The rotary shaft 150 is not fixed with respect to the counter substrate 130 either, and idly rotates with respect to the counter substrate 130.

It is preferred that the counter substrate 120 be, for example, a molded interconnect device (MID), on which the counter electrodes 121 are formed integrally. However, the counter substrate 120 is not limited to the molded interconnect device. The counter substrate 120 may be a substrate having a disc-like shape, onto which flexible printed circuits (FPCs) having counter electrodes patterned thereon are bonded. The same applies to the counter substrate 130.

As illustrated in FIG. 4, the counter substate 120 and the counter substrate 130 are each arranged away from the electret substrate 110 by a predetermined distance G in a direction of extension of the rotary shaft 150 so that the electret substrate 110 is sandwiched therebetween.

Shapes of the electret films and the counter electrodes in plan view are not limited to those illustrated in FIG. 5 and FIG. 6. Further, for example, a plurality of through holes may be formed through the electret substrate 110, the counter substrate 120, or the counter substrate 130 so as to be spaced apart from each other in the circumferential direction thereof by a predetermined distance, and the electret films or the counter electrodes may be arranged in a region in which the through holes are not formed.

Figure 7:
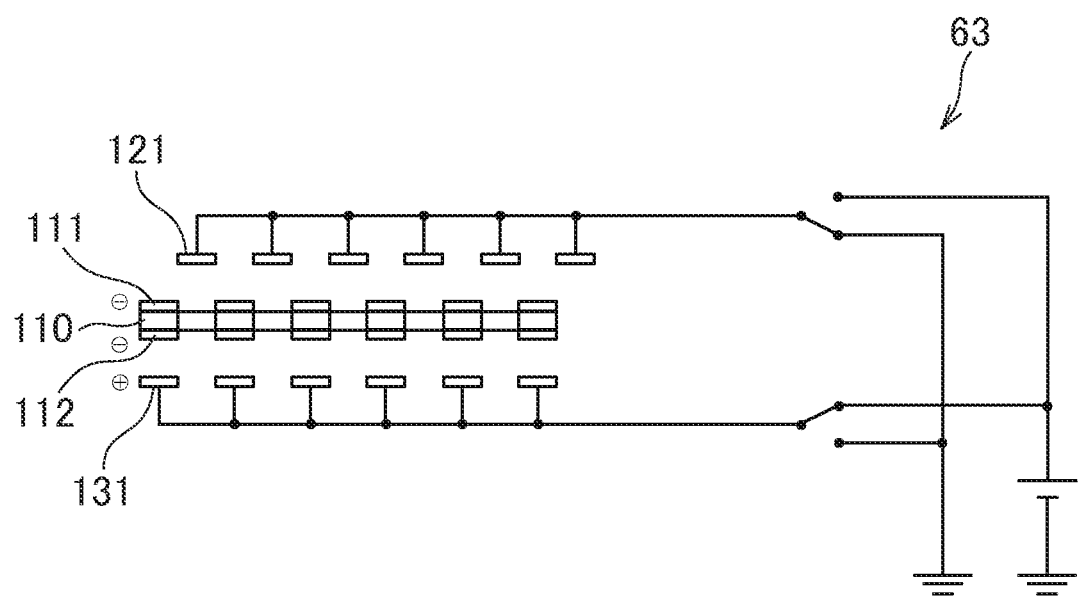
FIG. 7 is a schematic circuit diagram for illustrating an example of an operating principle of an electrostatic motor.

FIG. 7 is a schematic circuit diagram for illustrating an example of an operating principle of the electrostatic motor. As illustrated in FIG. 7, the electret films 111 provided on the electret substrate 110 and the counter electrodes 121 provided on the counter substrate 120 are arranged so as to be spaced away from each other by a predetermined micro-distance. Similarly, the electret films 112 provided on the electret substrate 110 and the counter electrodes 131 provided on the counter substrate 130 are arranged so as to be spaced away from each other by a predetermined micro-distance. In FIG. 7, the illustration of the counter substrates 120 and 130 is omitted.

Further, as described above, each of the counter substrate 120 and the counter substrate 130 has such a configuration that a region on which the electrode is provided and a region on which the electrode is not provided are alternately arranged in the circumferential direction of the counter substrates 120 and 130. The electret substrate 110 has a configuration that a region where the electret film is provided and a region that the electret film is not provided are alternately arranged in the circumferential direction.

The electret films 111 and 112 are formed so as to be held in a predetermined electrically charged state. In this embodiment, the electret films 111 and 112 are charged so as to both have a negative electric charge. Further, the counter electrodes 121 are arranged on the counter substrate 120 and the counter electrodes 131 are arranged on the counter substrate 130 so that phases are different from each other in the circumferential direction of the counter substrates 120 and 130. The control circuit 40 controls a switch 63 included in the electrostatic-motor driving circuit 50 so that an electric charge having a polarity opposite to that of the electrically charged state of the electrode films 111 and 112 is applied at a predetermined timing.

When the electric charge of the polarity opposite to that of the electrically charged state of the electret films 111 and 112 is applied to any one of the counter electrodes 121 and the counter electrodes 131, the electret substrate 110 is rotated by an electrostatic force so that the electret films 111 or the electret films 112 face the counter electrodes to which the electric charge of the opposite polarity is applied. When the application of the electric charge of the opposite polarity to any one of the counter electrodes 121 and the counter electrodes 131 is alternately switched at an appropriate timing by suitably turning on and off the switch 63, the electret substrate 110 can continuously make a rotary motion. Along with the rotation of the electret substrate 110, the rotary shaft 150 is rotated. In this manner, the rotary motion can be extracted from the electrostatic motor 200.

In FIG. 7, there is illustrated an example in which the counter electrodes 121 are arranged on the counter substrate 120 and the counter electrodes 131 are arranged on the counter substrate 130 so that the phases thereof are different from each other in the circumferential direction of the counter substrates 120 and 130. However, the arrangement of the counter electrodes 121 and 131 is not limited thereto. The counter electrodes 121 and the counter electrodes 131 may be arranged so that the phases thereof match with each other in the circumferential direction of the counter substrates 120 and 130.

Figure 8:
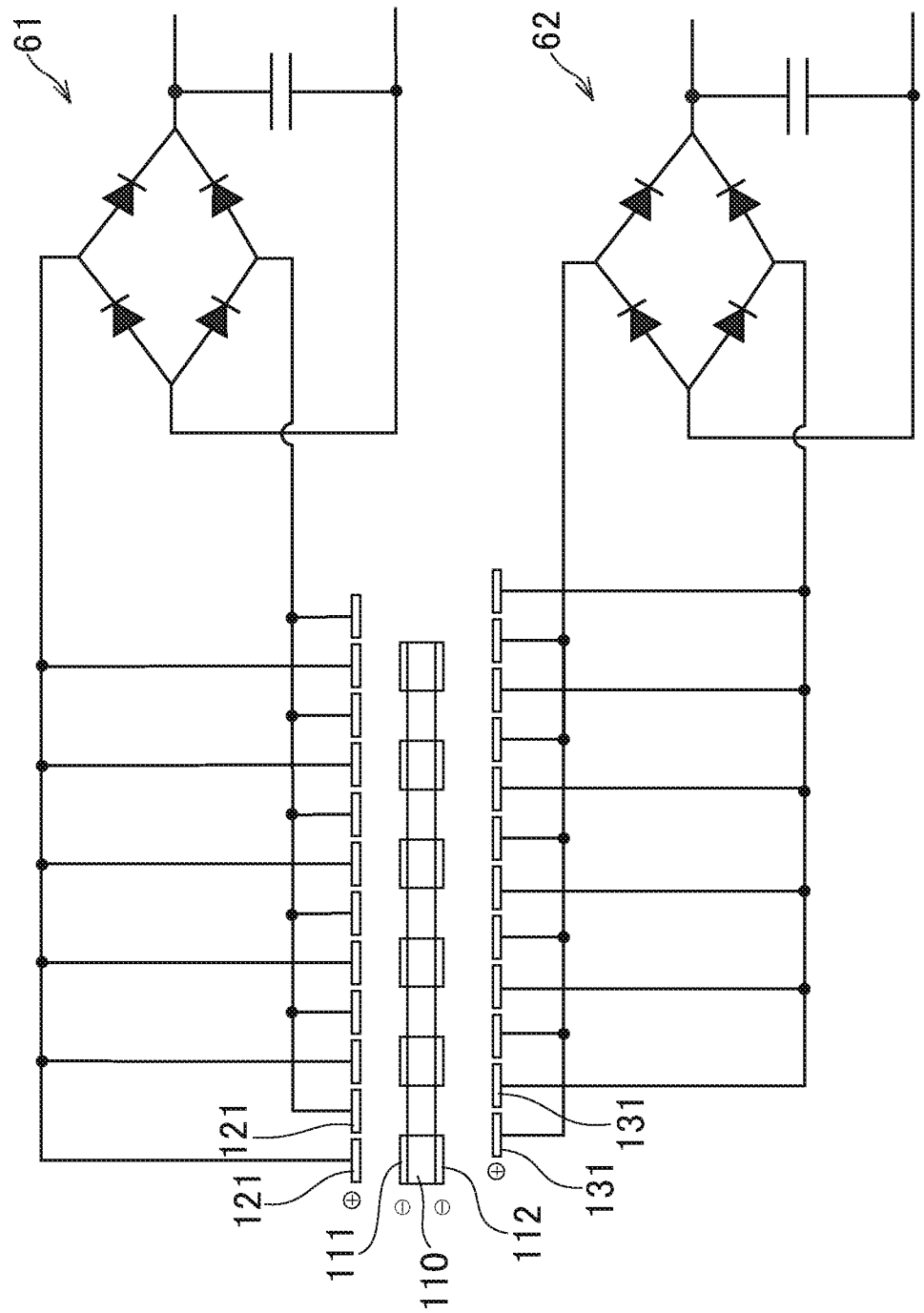
FIG. 8 is a schematic circuit diagram for illustrating an example of an operating principle of an electrostatic induction type electric power generating device.

FIG. 8 is a schematic circuit diagram for illustrating an example of an operating principle of the electrostatic induction type electric power generating device. Even in this case, the electret substrate 110 and the counter substrates 120 and 130 are arranged so that each of the counter substrates 120 and 130 is spaced away from the electret substrate 110 by a predetermined micro-distance and is opposed to the electret substrate 110.

In the electric power generating device 100, the electret substrate 110 is rotated along with the rotation of the rotary shaft 150. As a result, switching between a state in which the electret films 111 and the counter electrodes 121 face each other and a state in which the electret films 111 and the counter electrodes 121 do not face each other is performed, and, at the same time, switching between a state in which the electret films 112 and the counter electrodes 131 face each other and a state in which the electret films 112 and the counter electrodes 131 do not face each other is performed. The rotary shaft 150 has, for example, a pinion. In this case, it is preferred that oscillation of an oscillating weight 15 be transmitted through intermediation of a wheel train (not shown), which is meshed with the pinion. Then, it is preferred that the rotary shaft 150 and the electret substrate 110 be rotated along with the oscillation of the oscillating weight 15. It is preferred that the oscillating weight 15 be provided, for example, so as to oscillate along with movement of a user's arm while, for example, a user wearing the watch 1 on the wrist is walking.

Further, the electret films 111 and 112 are formed so as to be held in a predetermined electrically charged state. In this embodiment, the electret films 111 and 112 are electrically charged so as to both have a negative electric charge. Under a state in which the counter electrodes 121 provided on the counter substrate 120 face the electret films 111, an electric charge of the opposite polarity is induced by a surface charge of each of the electret films 111 so as to be accumulated in the counter electrodes 121 (in this embodiment, a positive electric charge is accumulated in the counter electrodes 121). Then, after the electret substrate 110 is rotated and the electret films 111 do not face the counter electrodes 121, the electric charge, which has been induced and accumulated in the counter electrodes 121, is emitted. After being rectified by the rectifying circuit 61, the emitted electric charge is extracted as electrical energy.

Similarly, under a state in which the counter electrodes 131 provided on the counter substrate 130 face the electret films 112, an electric charge of the opposite polarity is induced by a surface charge of each of the electret films 112 so as to be accumulated in the counter electrodes 131 (in this embodiment, a positive electric charge is accumulated in the counter electrodes 131). Then, after the electret substrate 110 is rotated and the electret films 112 do not face the counter electrodes 131, the electric charge, which has been induced and accumulated in the counter electrodes 131, is emitted. After being rectified by the rectifying circuit 62, the emitted electric charge is extracted as electrical energy.

The circuit configuration for using the above-mentioned electrostatic induction type converter as the electric power generating device 100 or the electrostatic motor 200 is merely an example, and other configurations may be adopted.

Figure 9:
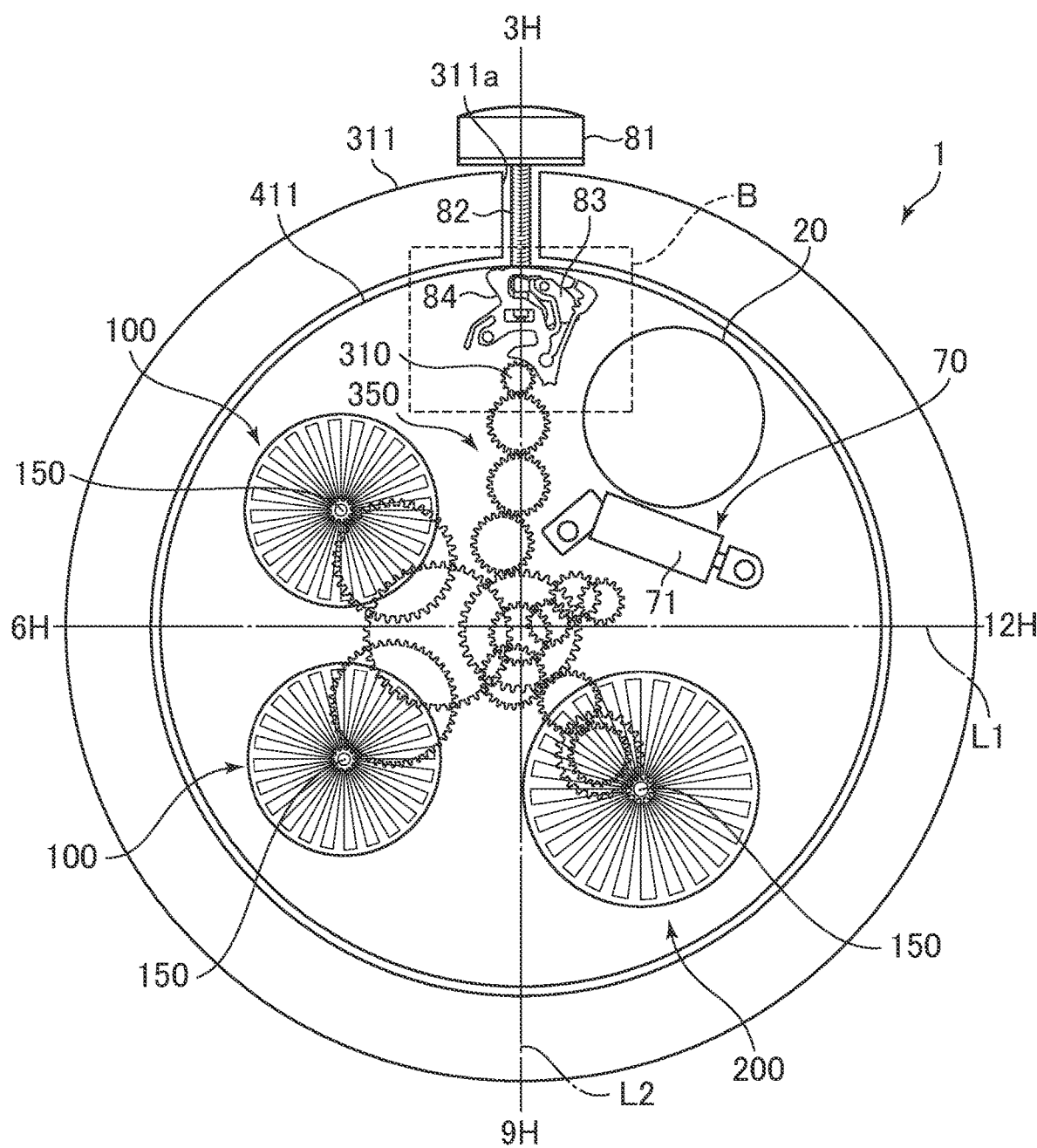
FIG. 9 is a schematic plan view of an inside of the watch according to the embodiment of the present invention when viewed from a back side.
Figure 10:
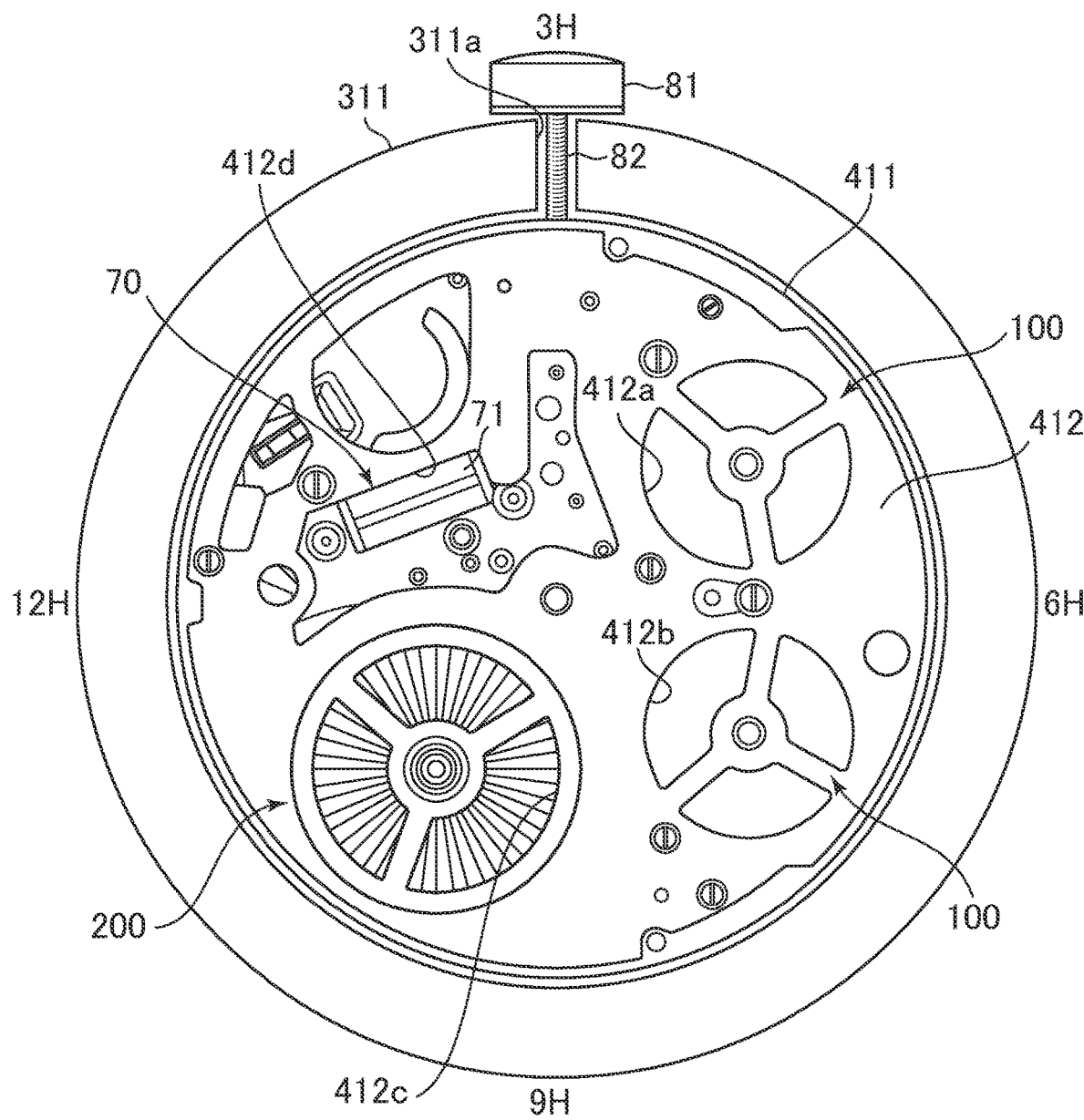
FIG. 10 is a schematic plan view of the inside of the watch according to the embodiment of the present invention when viewed from a front side.

Next, with reference to FIG. 9 and FIG. 10, arrangement of the members of the watch according to the embodiment is described. FIG. 9 is a schematic plan view of an inside of the watch according to this embodiment when viewed from the backside (case backside). FIG. 10 is a schematic plan view of the inside of the watch according to this embodiment when viewed from the front side (watch glass side). In reality, for example, the clock circuit substrate 413 is arranged on the case back 312 side (surface side of the drawing sheet of FIG. 9) with respect to, for example, the electrostatic motor 200. However, for the illustration of, for example, the electrostatic motor 200, the illustration of the members such as the clock circuit substrate 413 is omitted in FIG. 9. Further, in FIG. 9, the illustration of a setting wheel plate 85 of a transmission mechanism described later is omitted.

In FIG. 9 and FIG. 10, a three o'clock position at which the crown 81 is arranged is indicated by "3H", a nine o'clock position is indicated by "9H", a six o'clock position is indicated by "6H", and a twelve o'clock position is indicated by "12H".

As described above, the watch 1 includes the crown 81 configured to accept the operation performed by the user. Further, the watch 1 includes, as mechanisms configured to transmit the operation accepted by the crown 81 to the inside of the watch 1, a setting stem 82, a setting lever 83, a setting lever jumper 84, and the setting wheel plate 85. It is preferred that, for example, a waterproofing sealing member (not shown) made of a rubber be provided between the setting stem 82 and an inner peripheral surface of an opening 311a of the case body 311. Further, it is preferred that the setting stem 82 and the crown 81 be isolated from the inner peripheral surface of the opening 311a of the case body 311 by the sealing member made of a rubber provided therebetween. Specifically, it is preferred that the setting stem 82 and the crown 81 be not held in direct contact with the case body 311.

In the following description, the crown 81 and the setting stem 82 mounted to the crown 81 are collectively referred to as "operating member". Further, the setting lever 83, the setting lever jumper 84, and the setting wheel plate 85 are collectively referred to as "transmission mechanism". The members for forming the transmission mechanism are arranged in a region surrounded by a broken line B of FIG. 9. The transmission mechanism operates in association with the operation of the crown 81 having accepted the operation performed by the user. Power of the transmission mechanism is transmitted to a hand shaft through intermediation of the wheel train to thereby fulfill various functions such as time correction. The members for forming the transmission mechanism are not limited to those described above. Besides, it is preferred that the members for forming the transmission mechanism include a so-called yoke. A posture of the yoke is displaced in accordance with a displacement of a posture of the setting lever 83.

The members for forming the transmission mechanism are made of a material having electroconductivity, and are held in contact with each other so as to operate in association with each other. Thus, the members are electrically continuous with each other. It is preferred that the members for forming the transmission mechanism be made of a metal. Details of the transmission mechanism are described later with reference to FIG. 11 to FIG. 14.

Although description has been made with reference to FIG. 1 and FIG. 3, the watch 1 includes, as illustrated in FIG. 9, the battery 20, the electromagnetic motor 70, electric power generating devices 100, and the electrostatic motor 200. In FIG. 9, a coil 71 included in the electromagnetic motor 70 is illustrated.

As illustrated in FIG. 9, the watch 1 includes two electric power generating devices 100 and one electrostatic motor 200. The two electric power generating devices 100 are provided so as to obtain sufficient power generation amount. However, the number of electric power generating devices 100 is not limited to two, and the number of electric power generating devices 100 may be one or three or more.

In this case, in the electrostatic motor 200, it is preferred that the charging voltage of the electret substrate 110 be maintained with high accuracy. The reason is as follows. When the charging voltage deviates from a normal value, there arises a risk in that the electrostatic motor 200 cannot be appropriately driven. Thus, it is preferred that the electrostatic motor 200 be arranged so as to be separate from a member which may affect the charging voltage.

As illustrated in FIG. 9, in this embodiment, the electric power generating devices 100, the electrostatic motor 200, the battery 20, the coil 71 included in the electromagnetic motor 70 are arranged so as to avoid overlapping with each other in plan view. When the relatively large members among the members provided inside the watch 1 are arranged so as to avoid overlapping with each other, a thickness of the watch 1 can be reduced.

Further, as illustrated in FIG. 9, four regions are defined by a straight line L1 for connecting the twelve o'clock position and the six o'clock position and a straight line L2 for connecting the three o'clock position and the nine o'clock position. In different four regions, the two electric power generating devices 100, the electrostatic motor 200, and a set of the battery 20 and the electromagnetic motor 70 are respectively arranged. Further, more specifically, the rotary shaft 150 of one of the electric power generating devices 100, the rotary shaft 150 of another one of the electric power generating devices 100, the rotary shaft 150 of the electrostatic motor 200, and a set of the battery 20 and the coil 71 of the electromagnetic motor 70 are respectively arranged in the four different regions defined by the straight line L1 and the straight line L2.

Further, the electrostatic motor 200 including the electret films 111 and 112, which have been electrically charged, may be affected by electricity and magnetism. In this embodiment, the electrostatic motor 200 is arranged so as to avoid overlapping with the battery 20 and the electromagnetic motor 70. Thus, the electrostatic motor 200 can be normally driven without being affected by the electricity and the magnetism, which are generated in the battery 20 and the electromagnetic motor 70.

Further, for the watch 1, there can be adopted a technology of detecting a counter electromotive force generated in the electromagnetic motor 70 to detect rotation of a rotor included in the electromagnetic motor 70. The counter electromotive force has a micro current waveform. The electrostatic motor 200 according to this embodiment is controlled at a high voltage. Thus, noise from a wiring to be connected to a circuit including, for example, the switch 63 may affect the detection of the rotation of the rotor included in the electromagnetic motor 70. Thus, when the electromagnetic motor 70 is arranged in the vicinity of the electrostatic motor 200, there arises a risk in that the rotation cannot be appropriately detected. Further, when the electromagnetic motor 70 is arranged in the vicinity of the electrostatic motor 200, there arises a risk in that the rotation may be affected by the charging voltage of the electret substrate 110 and cannot be appropriately detected. Thus, it is preferred that the electromagnetic motor 70 be arranged so as to avoid overlapping with the electrostatic motor 200 in plan view. Further, for ease of layout, when at least one of the members for forming the electrostatic motor 200 is arranged so as to overlap with the electromagnetic motor 200 in plan view, it is preferred that a shielding layer (not shown) formed of, for example, an electroconductive film be provided between a layer including the wiring to be connected to the circuit including, for example, the switch 63 and the electromagnetic motor 70. It is preferred that the shielding layer have a solid pattern. When the shielding layer is provided as described above, the electromagnetic motor 70 can be prevented from being affected by the noise from the wiring to be connected to the circuit including, for example, the switch 63 configured to drive the electrostatic motor 200.

Further, the electrostatic motor 200 is arranged so as to avoid overlapping with the electric power generating devices 100 in plan view. With the arrangement described above, the electric charge of the electret films 111 and the electric charge of the electret films 112, which are included in the electrostatic motor 200, can be prevented from mutually affecting each other.

In FIG. 10, there is illustrated a state in which an hour wheel holder 412 is arranged on the front side with respect to the main plate 411. The hour wheel holder 412 is a metal plate configured to support an hour wheel, which is a wheel configured to turn the hour hand 4. In the example of FIG. 10, the hour wheel holder 412 has through-hole portions 412a, 412b, 412c, and 412d. The through-hole portions 412a and 412b correspond to second through-hole portions, which have shapes respectively corresponding to shapes of the electric power generating devices 100. The through-hole portion 412c corresponds to a first through-hole portion, which has a shape corresponding to a shape of the electrostatic motor 200. The through-hole portion 412d corresponds to another through-hole portion, which has a shape corresponding to a shape of the coil 71 of the electromagnetic motor 70. As described above, the hour wheel holder 412 has the through-hole portion 412c having the shape corresponding to the shape of the electrostatic motor 200. Thus, at least a part of the electrostatic motor 200 does not overlap with the hour wheel holder 412 in plan view. With the arrangement described above, the electrostatic motor 200 is less liable to be affected by the hour wheel holder 412 made of a metal.

In this case, when the user operates the crown 81, there arises a risk in that static electricity may be generated and flow into the watch 1 through the crown 81. The static electricity may affect the charging voltage of the electret substrate 110 included in the electrostatic motor 200. In this embodiment, the electrostatic motor 200 is used to move the second hand 2, and is required to be normally operated so as not to impair an original function of the watch to indicate time.

In particular, when the static electricity flows into the vicinity of the electret surfaces 111a and 112a of the electret substrate 110 of the electrostatic motor 200, the charging voltage of the electret substrate 110 is more liable to be affected. Specifically, when the electret substrate 110 and a conduction path of the static electricity flowing from the crown 81 overlap with each other in plan view, driving of the electrostatic motor 200 is more liable to be affected by the static electricity.

Thus, in this embodiment, the electrostatic motor 200 is arranged at such a position as to be less liable to be affected by the static electricity flowing into the watch 1. Specifically, the electrostatic motor 200 is arranged so as to avoid overlapping with a conduction path for conduction between the crown 81 and the case back 312 in plan view. In this case, the term "conduction path" denotes a path for electrically short-circuiting the static electricity flowing from the crown 81 to the case back 312. Now, conduction paths are described further in detail.

Figure 11:
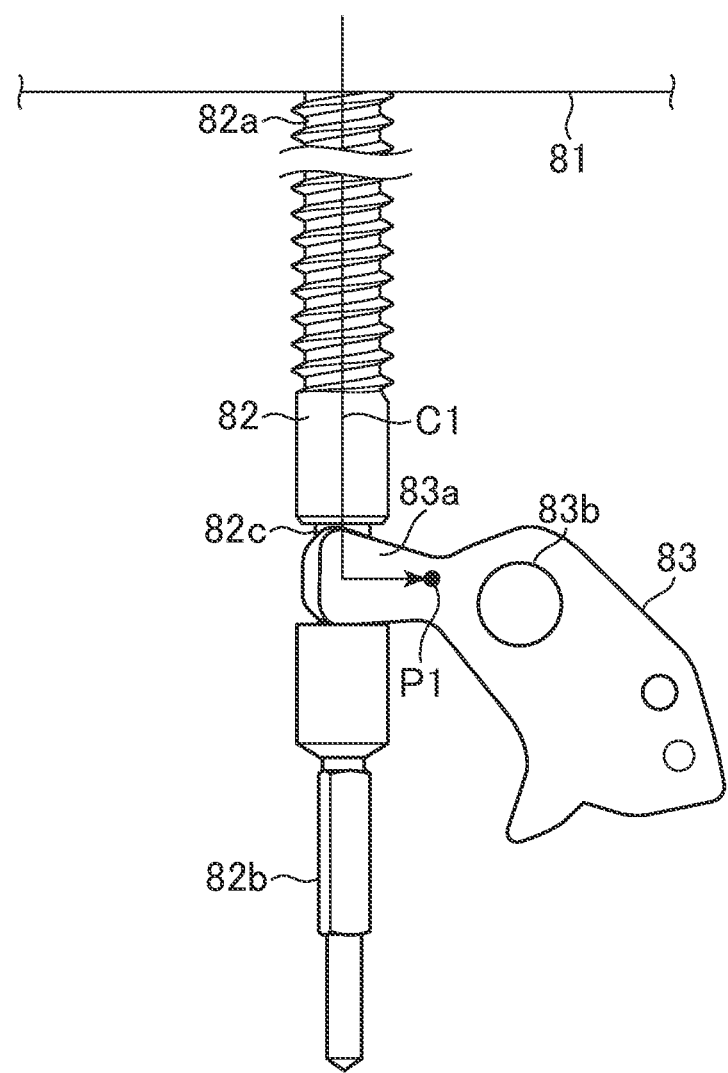
FIG. 11 is a view for illustrating configurations of a setting stem and a setting lever, and a conduction path.
Figure 12:
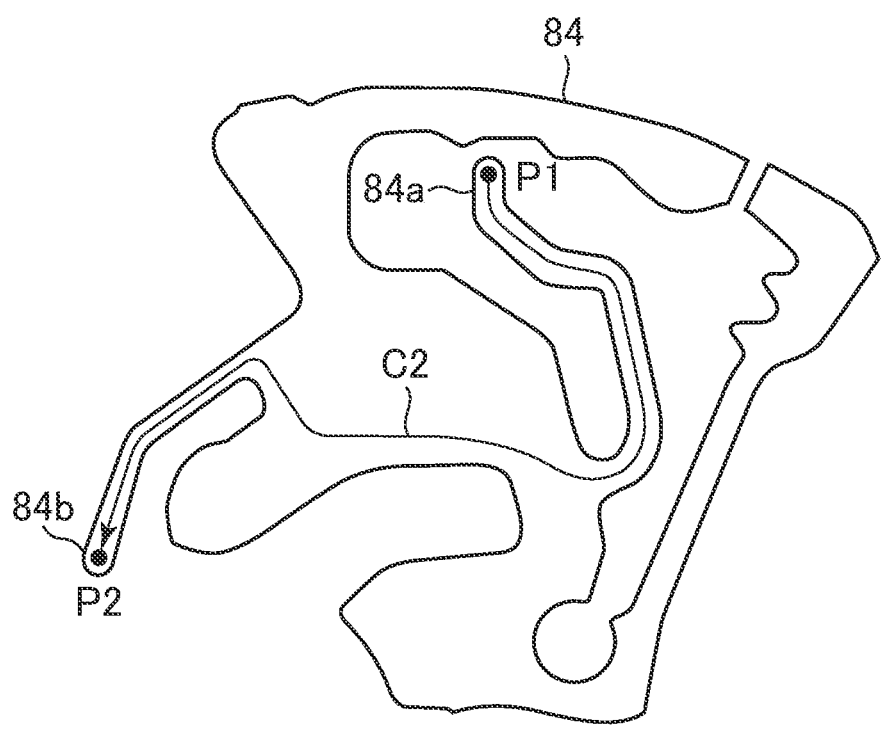
FIG. 12 is a view for illustrating a configuration of a setting lever jumper and a conduction path.
Figure 13:
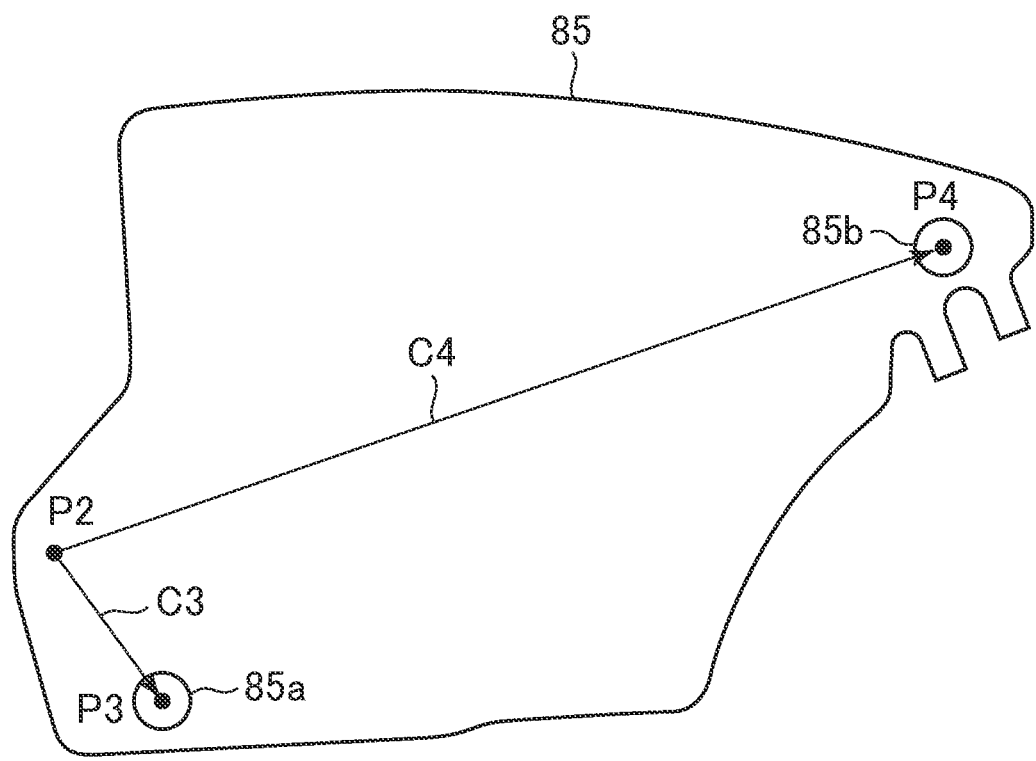
FIG. 13 is a view for illustrating a setting wheel plate and conduction paths.
Figure 14:
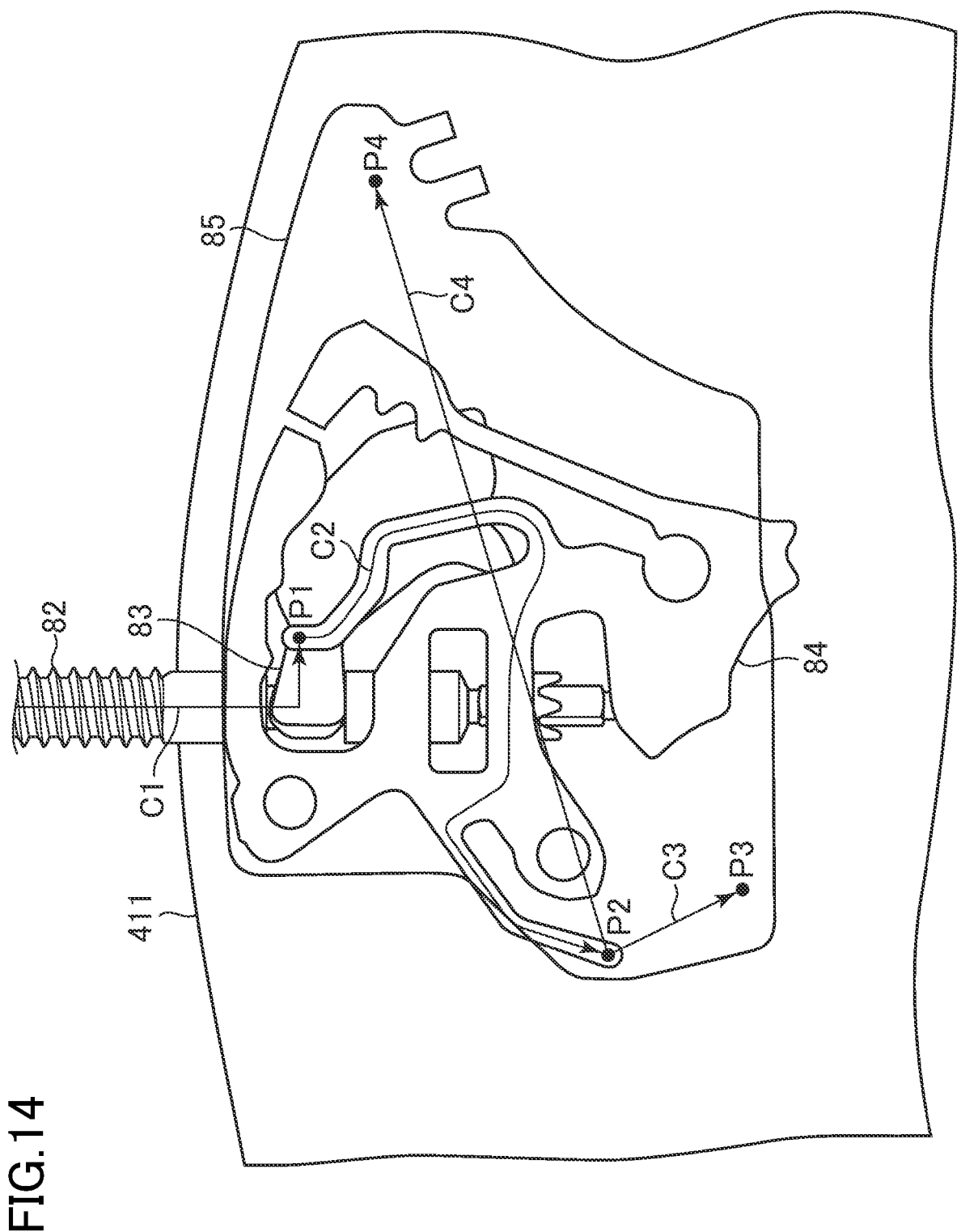
FIG. 14 is an enlarged view of a region B of FIG. 9, for illustrating conduction paths.
Figure 15:
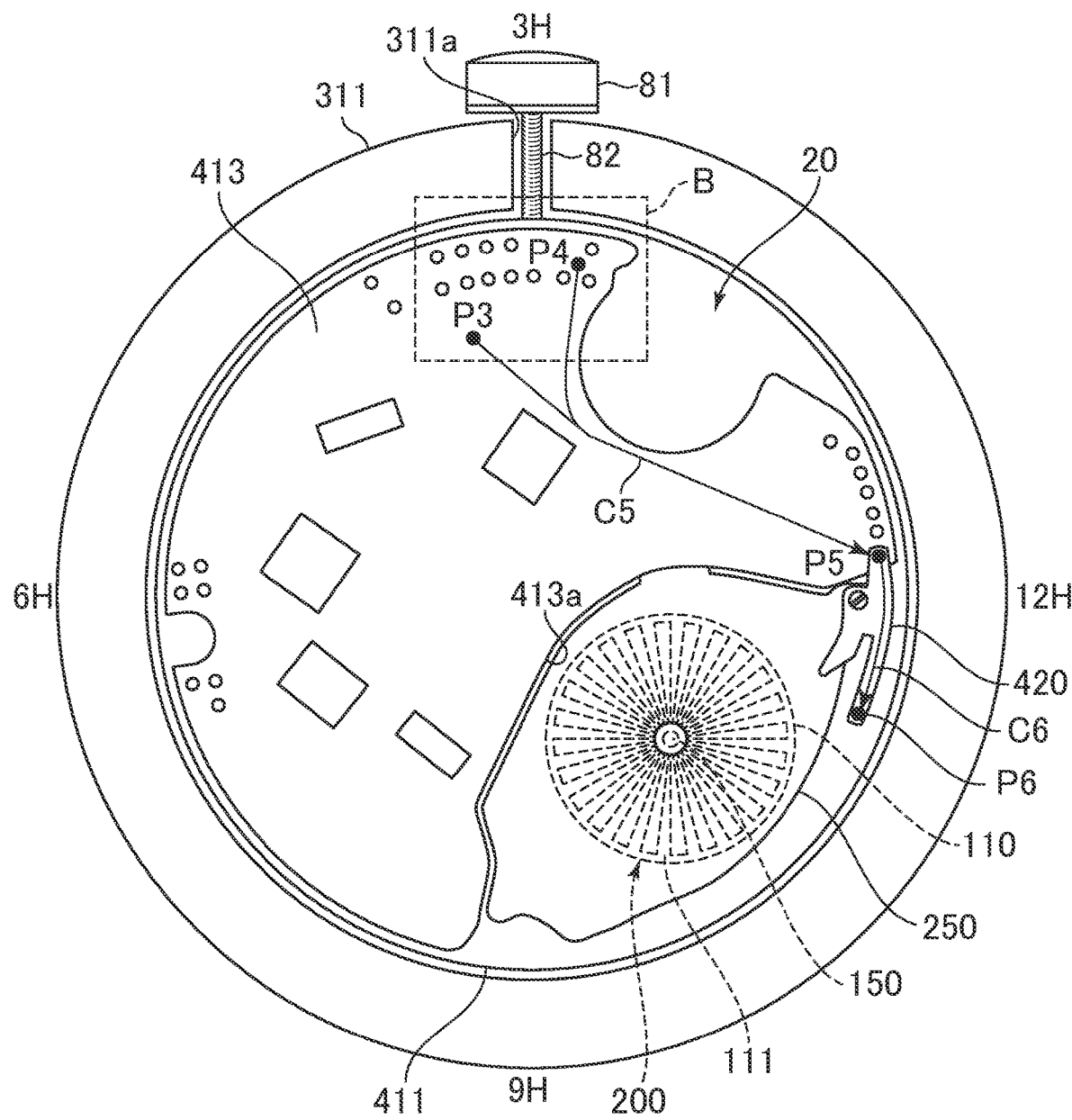
FIG. 15 is a view for illustrating an internal configuration of the watch according to the embodiment of the present invention and conduction paths.

Referring to FIG. 9 to FIG. 15, conduction paths for conduction between the crown 81 and the case back 312 in the watch 1 are described. FIG. 11 is a view for illustrating configurations of the setting stem and the setting lever and a conduction path. FIG. 12 is a view for illustrating a configuration of the setting lever jumper and a conduction path. FIG. 13 is a view for illustrating a configuration of the setting wheel plate and conduction paths. FIG. 14 is an enlarged view of the region B of FIG. 9, for illustrating conduction paths. FIG. 15 is a view for illustrating an internal configuration of the watch according to this embodiment and conduction paths. Each of FIG. 11 to FIG. 15 is a plan view when viewed from the back side. The setting lever 83, the setting lever jumper 84, the setting wheel plate 85 are arranged in the stated order from the front side (side opposite to the surface side of the drawing sheets of FIGS. 11 to 15) to the back side (surface side of the drawing sheets of FIGS. 11 to 15). In FIG. 14, for easy understanding of the conduction paths, the members are all indicated by solid lines.

As illustrated in FIG. 11, the crown 81 is mounted to a base end portion 82a of the setting stem 82. Further, a distal end portion 82b of the setting stem 82 is inserted into the opening 311a (see, for example, FIG. 9) formed at a position of the case body 311 (see FIG. 2) on the three o'clock side so as to be located inside the watch 1. The setting stem 82 is provided so as to allow rotational movement and straight movement (push and pull operation) in a direction of extension of the setting stem 82 when the user operates the crown 81. Although a detailed illustration is herein omitted, wheels such as a crown wheel and a clutch wheel are mounted on the distal end portion 82b side of the setting stem 82. The wheels provided on the distal end portion 82b side of the setting stem 82 mesh with a setting wheel 310 illustrated in FIG. 9 to rotate the setting wheel 310. The rotation of the setting wheel 310 is transmitted to the hand shaft provided at the center of the watch 1 through intermediation of a wheel train 350. With the configuration described above, when the user operates the crown 81, time correction can be performed.

Further, as illustrated in FIG. 11, the setting stem 82 has a groove portion 82c formed in a peripheral surface thereof. The setting lever 83 has a projecting pin 83a having a projecting shape in plan view. The projecting pin 83a of the setting lever 83 is fitted into the groove portion 82c of the setting stem 82 and is held in contact with the groove portion 82c. Thus, the setting stem 82 and the setting lever 83 are electrically continuous with each other.

The projecting pin 83a of the setting lever 83 is fitted into the groove portion 82c of the setting stem 82. Thus, when the user performs the operation, along with the straight movement of the setting stem 82 in the direction of extension of the setting stem 82, the setting lever 83 rocks about a positioning pin 83b illustrated in FIG. 11.

The setting lever jumper 84 is provided on the back side with respect to the setting lever 83, and has an elastic portion 84a bent toward the surface side (rear side of the setting lever jumper 84 on the drawing sheet of FIG. 12). The elastic portion 84a is held in elastic contact with the setting lever 83 at a contact point P1 illustrated in FIG. 11 and FIG. 12. In this manner, a conduction path C1 extending from the crown 81 to the setting lever 83 is formed.

The setting lever jumper 84 urges the setting lever 83 so that the setting stem 82 is located at a specific position. As a result, when the user operates the crown 81, the user can have an appropriate click feeling. Further, the setting lever jumper 84 has the elastic portion 84b bent toward the back side (surface side of the drawing sheet of FIG. 12).

The setting wheel plate 85 is provided on the back side with respect to the setting lever jumper 84. Further, the elastic portion 84b of the setting lever jumper 84 is held in elastic contact with the setting wheel plate 85 at a contact point P2 illustrated in FIG. 12 and FIG. 13. As a result, a conduction path C2 extending from the setting lever 83 to the setting wheel plate 85 is formed.

Further, the setting wheel plate 85 has projections 85a and 85b projecting to the back side (surface side of the drawing sheet of FIG. 13). The projections 85a and 85b are held in contact with the clock circuit board 413 provided on the back side with respect to the setting wheel plate 85. More specifically, the setting wheel plate 85 is held in contact with a printed pattern formed on a front surface of the clock circuit board 413 at contact points P3 and P4 illustrated in FIG. 13. As a result, conduction paths C3 and C4 extending from the setting lever jumper 84 to the clock circuit board 413 are formed.

As described above, the crown 81 is electrically continuous with the clock circuit board 413 through intermediation of the setting stem 82, the setting lever 83, the setting lever jumper 84, and the setting wheel plate 85. In FIG. 14, all the conduction paths C1 to C4 illustrated in FIG. 11 to FIG. 13 are illustrated.

Further, the ground spring 420 is provided so as to be held in contact with a printed pattern formed on a back surface of the clock circuit board 413 at a contact point P5 illustrated in FIG. 15. As a result, a conduction path C5 extending from the setting wheel plate 85 to the ground spring 420 is formed. The printed pattern formed on the back surface of the clock circuit board 413 and the printed pattern formed on the front surface of the clock circuit board 413 are electrically continuous with each other via through holes.

Further, the ground spring 420 is held in elastic contact with the case back 312 provided on the back side with respect to the clock circuit board 413 at a contact point P6 illustrated in FIG. 15 and FIG. 2. As a result, a conduction path C6 extending from the clock circuit board 413 to the case back 312 is formed.

As described above, the setting stem 82, the setting lever 83, the setting lever jumper 84, the setting wheel plate 85, the clock circuit board 413, and the ground spring 420 form the conduction paths for conduction between the crown 81 and the case back 312.

As illustrated in FIG. 15, it is preferred that the clock circuit board 413, which forms the conduction paths between the crown 81 and the case back 312, may have a shape with a cutout 413a formed so as to avoid covering the electrostatic motor 200 in plan view.

In this embodiment, as illustrated in FIGS. 14 and 15, the electrostatic motor 200 is arranged so as to avoid overlapping with the conduction paths C1 to C6 for conduction between the crown 81 and the case back 312 in plan view. Specifically, the electrostatic motor 200 is arranged so as to avoid overlapping with the operating member (the crown 81 and the setting stem 82), the transmission mechanism (the region B in FIG. 9), the clock circuit board 413, and the ground spring 420 in plan view. Thus, even when static electricity flows into the watch 1 as a result of the operation of the crown 81, which is performed by the user, the static electricity is released to the case back 312 without flowing in proximity to the electrostatic motor 200. Thus, the electrostatic motor 200 can be normally operated without being affected by the static electricity flowing from outside.

Further, as illustrated in FIG. 9, it is preferred that the crown 81 and the rotary shaft 150 of the electrostatic motor 200 be respectively arranged in two different regions, which are defined by the straight line L1 for connecting the twelve o'clock position and the six o'clock position. As described above, when the electrostatic motor 200 is arranged at the position away from the crown 81, through which the static electricity flows into the watch 1, an influence of the static electricity can be suppressed.

The components for forming the watch 1 include not only the crown 81 and the setting stem 82 but also a plurality of members, each being made of a metal. Among the members made of a metal, the crown 81 and the setting stem 82 are small-size components. Thus, a current density of a current flowing through the crown 81 and the setting stem 82 is relatively high. Thus, it is considered that, for the arrangement of the electrostatic motor 200, a relationship with the crown 81 and the setting stem 82 among the components for forming the watch 1 is required to be especially taken into consideration.

Further, as illustrated in, for example, FIG. 9, it is preferred that a shortest distance between the electrostatic motor 200 and the battery 20 be larger than a shortest distance between the electromagnetic motor 70 and the battery 20 in plan view. When the electrostatic motor 200 is arranged at a position away from the battery 20, which may affect the charging voltage, the electrostatic motor 200 can be more stably driven.

The electrostatic motor 200 has been described as being arranged so as to avoid overlapping with the conduction paths C1 to C6 in plan view. However, the arrangement of the electrostatic motor 200 is not limited thereto. It is preferred that the electrostatic motor 200 be arranged so that at least the electret surfaces 111a and 112a of the electret substrate 110 included in the electrostatic motor 200 do not overlap with the conduction paths C1 to C6 in plan view. This is because it is the charging voltage of the electret substrate 110 that may be affected by the static electricity flowing into the watch 1 from the outside. When at least the electret surfaces 111a and 112a are arranged so as to avoid overlapping with the conduction paths C1 to C6 in plan view, the influence of the static electricity flowing into the watch 1 from the outside on the charging voltage of the electret substrate 110 can be suppressed.

The arrangement of the electrostatic motor 200, specifically, the electrostatic motor 200 arranged so as to avoid overlapping with the conduction paths C1 to C6 in plan view has been mainly described. Similarly, it is preferred that the electric power generating devices 100 be arranged so as to avoid overlapping with the conduction paths C1 to C6 in plan view. In, for example, FIG. 9 and FIG. 15, the electric power generating devices 100 are illustrated as being arranged so as to avoid overlapping with the conduction paths C1 to C6 in plan view. It is preferred that at least the electret surfaces 111a and 112a of the electret substrate 110 included in each of the electric power generating devices 100 be arranged so as to avoid overlapping with the conduction paths C1 to C6 in plan view. With the arrangement described above, an influence of the static electricity flowing into the watch 1 from the outside on the charging voltage of the electret substrate 110 included in each of the electric power generating devices 100 can be suppressed. As a result, each of the electric power generating devices 100 can generate power with higher efficiency.

As illustrated in FIG. 15, it is preferred that the electrostatic motor 200 be modularized and accommodated inside a case 250. With adoption of the configuration described above, the electrostatic motor 200 can more easily be handled with, for example, improved ease of assembly onto the main plate 411.

Figure 16:
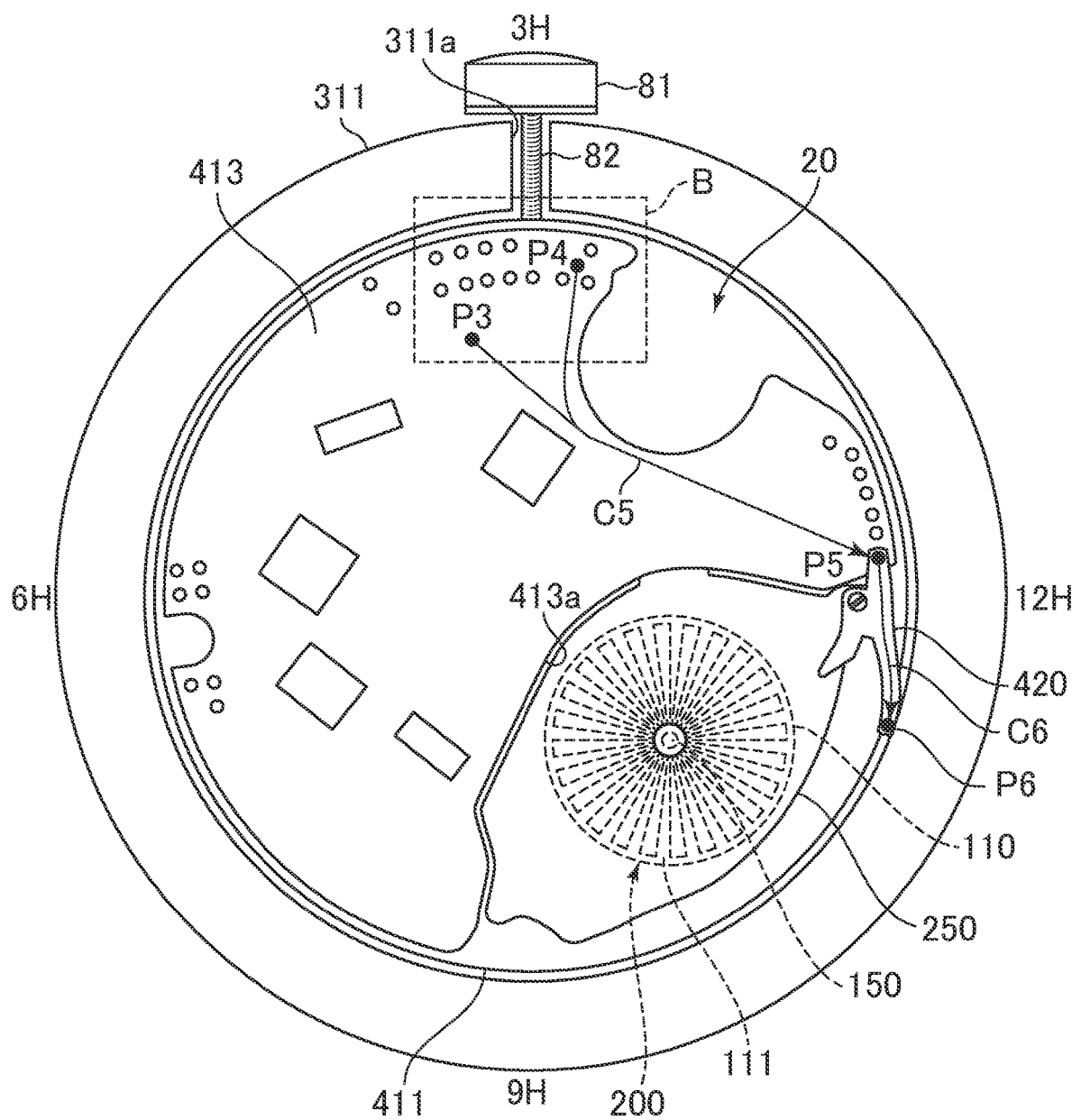
FIG. 16 is a view for illustrating an internal configuration of a watch according to a first modification example of the embodiment of the present invention and conduction paths.

In this embodiment, the case back 312 is adopted as a member configured to release the static electricity from the outside. However, the member configured to release the static electricity is not limited to the case back 312. As illustrated in FIG. 16, the case body 311 may be used as the member configured to release the static electricity. In FIG. 16, there is illustrated an example (first modification example) in which the ground spring 420 is held in elastic contact with an inner surface of the case body 311 at the contact point P6. In the example illustrated in FIG. 16, the ground spring 420 is not required to be held in contact with the case back 312 (not shown in FIG. 16) arranged on the surface side of the drawing sheet of FIG. 16. With the configuration described above, the crown 81 is electrically continuous with the case body 311 via the conduction paths C1 to C4 (see, for example, FIG. 14) and the conduction paths C5 and C6 (see FIG. 16). In this case, it is preferred that the electret surfaces 111a and 112a of the electret substrate 110 included in the electrostatic motor 200 be arranged so as to avoid overlapping with the conduction paths C1 to C6 for conduction between the crown 81 and the case body 311 in plan view. When the configuration illustrated in FIG. 16 is adopted, it is preferred that the electret surfaces 111a and 112a of the electret substrate 110 included in each of the electric power generating devices 100 be similarly arranged so as to avoid overlapping with the conduction paths C1 to C6 for conduction between the crown 81 and the case body 311 in plan view.

A member provided for conduction with the case body 311 is not limited to the ground spring 420, and may be another metal member. Now, an example in which positioning members 411a configured to position the main plate 411 are brought into conduction with the case body 311 is described with reference to FIG. 17.

Figure 17:
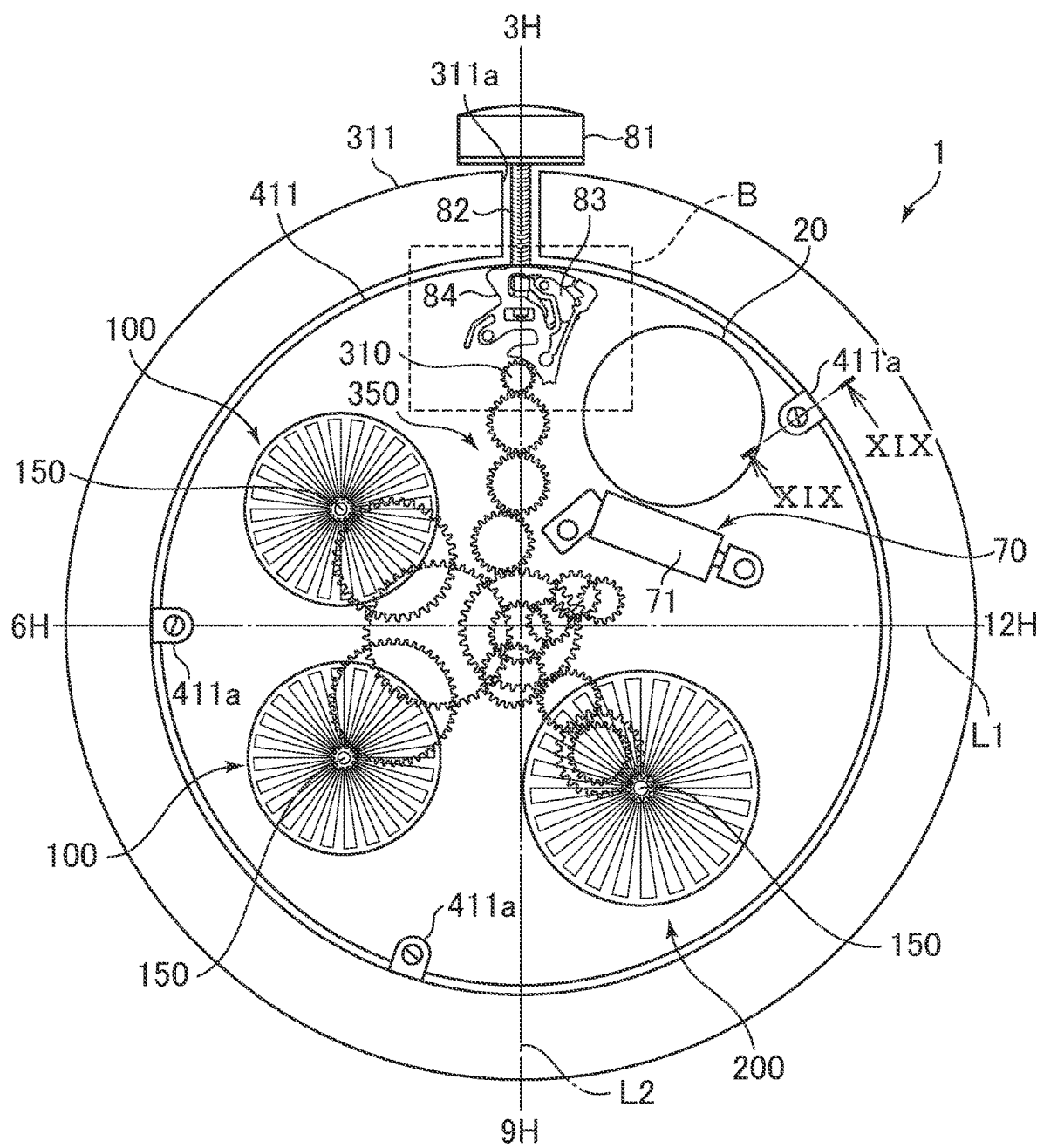
FIG. 17 is a schematic plan view of an inside of a watch according to a second modification example of the embodiment of the present invention when viewed from the back side.
Figure 18:
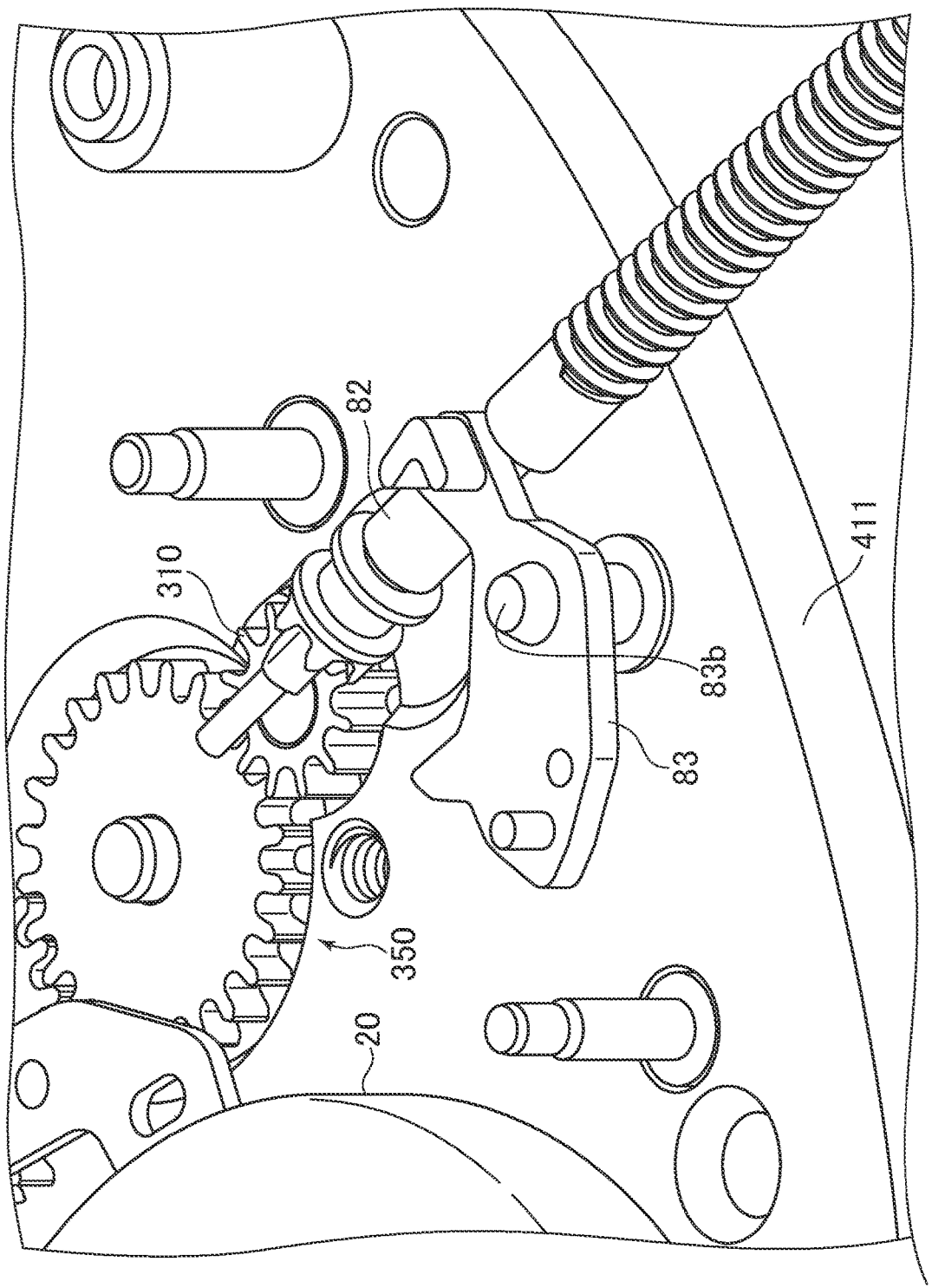
FIG. 18 is a perspective view for illustrating a setting lever and its surroundings.
Figure 19:
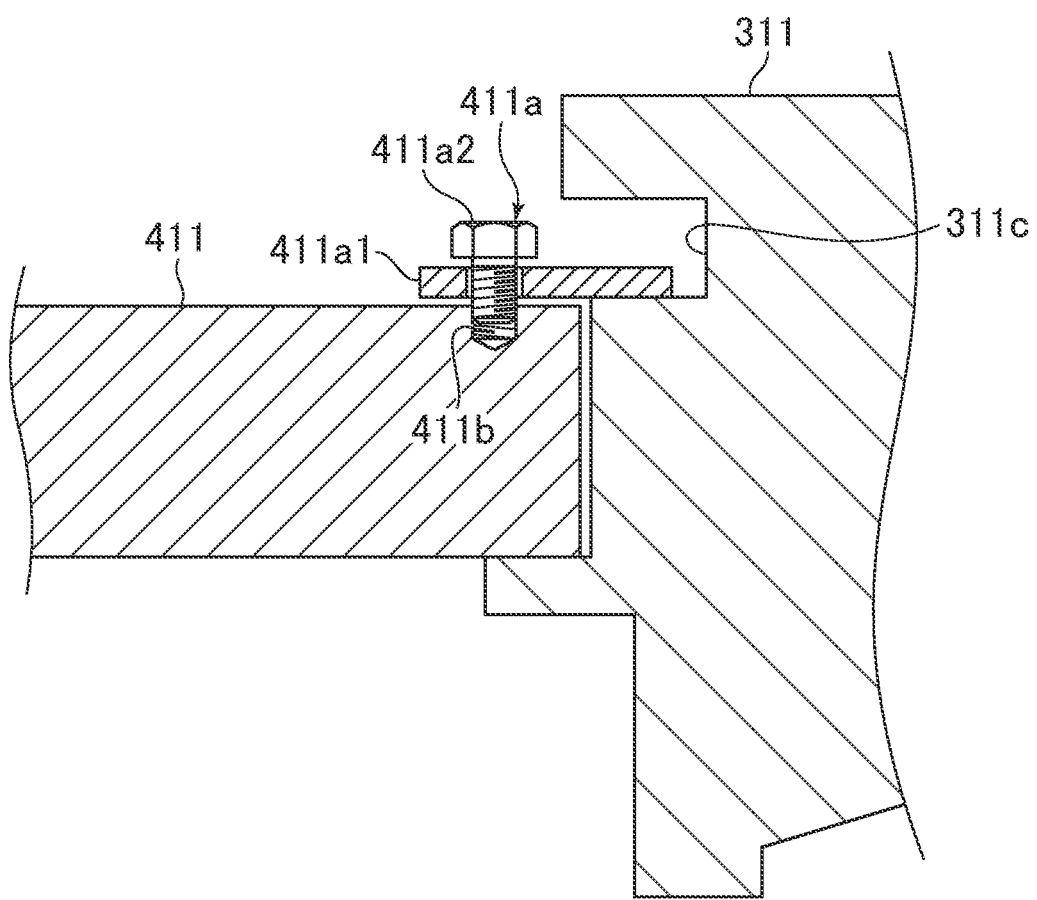
FIG. 19 is a sectional view for illustrating a cross section taken along the line XIX-XIX of FIG. 17.

FIG. 17 is a schematic plan view of an inside of a watch of a second modification example when viewed from the back side. A configuration illustrated in FIG. 17 is the same as the configuration illustrated in FIG. 9 except that the positioning members 411a are provided. FIG. 18 is a perspective view for illustrating the setting lever and its surroundings. FIG. 19 is a sectional view for schematically illustrating a cross section taken along the line XIX-XIX of FIG. 17. In this embodiment, the main plate 411 is formed of a conductive member made of, for example, a metal.

The setting lever 83 rocks about a positioning pin 83b. As illustrated in FIG. 18, the positioning pin 83b is fixed to the main plate 411. Further, the positioning pin 83b is formed of a conductive member made of, for example, a metal. Thus, a conduction path via the positioning pin 83b is formed between the setting lever 83 and the main plate 411.

The positioning member 411a includes a casing clamp 411a1 and a screw 411a2. The screw 411a2 is inserted into a screw hole formed on one end side of the casing clamp 411a1. Further, as illustrated in FIG. 19, the case body 311 has a groove 311c, which is recessed in a radial direction of the case body 311. Each of the casing clamp 411a1 and the screw 411a2 is formed of a conductive member made of, for example, a metal.

As illustrated in FIG. 19, the casing clamp 411a1 is fastened with use of the screw 411a2 under a state in which a part of another end side of the casing clamp 411a1 is held in contact with a side surface of the groove 311c. The screw 411a2 is inserted into a screw hole 411b formed in the base plate 411 via a screw hole of the casing clamp 411a1. As a result, the main plate 411 and the casing clamp 411a are positioned with respect to the case body 311. At the same time, a conduction path via the positioning member 411a is formed between the main plate 411 and the case body 311.

With the configuration described above, the conduction paths are formed between the positioning pin 83b and the case body 311. Through the conduction paths and the above-mentioned conduction path C1 formed between the crown 81 and the setting lever 83, the crown 81 and the case body 311 are electrically continuous with each other. In the example illustrated in FIG. 17, three positioning members 411a are provided. However, the number and the arrangement of positioning members 411a are not limited to those illustrated in FIG. 17. Among four regions defined by the straight line L1 for connecting the twelve o'clock position and the six o'clock position and the straight line L2 for connecting the three o'clock position and the nine o'clock position, it is preferred that at least one of the positioning members 411a be arranged in the region different from the region in which the rotary shaft 150 of the electrostatic motor 200 is arranged. In the example illustrated in FIG. 17, one of the positioning members 411a is arranged in the region between the twelve o'clock position and the three o'clock position. The static electricity flowing from the outside flows through the positioning member 411a into the case body 311, and is released in the case body 311.

In this embodiment, through-hole portions for allowing a part of the electret substrate 110 to be viewed from the outside are formed through the dial 32. More specifically, as illustrated in FIG. 1, through-hole portions 321, 322, and 323 are formed through the dial 32. Each of the through-hole portions 321 and 322 allows a part of the electret substrate 110 included in a corresponding one of the electric power generating devices 100 to be viewed from the outside. The through-hole portion 323 allows a part of the electret substrate 110 included in the electrostatic motor 200 to be viewed from the outside. With the through-hole portions described above, the user can view a rotational operation of the electret substrate 110, and design properties are improved. For allowing viewing of the electret substrates 110 from the outside, it is preferred that each of the counter substrates, which are arranged on the dial 32 side with respect to the electret substrates 110, be formed of a transparent material. In this case, as the counter electrodes to be provided on each of the counter substrates made of a transparent material, it is preferred that transparent electrodes made of, for example, indium tin oxide (ITO) be used.

Further, as illustrated in FIG. 10, the hour wheel holder 412 provided between, for example, the electrostatic motor 200 and the dial 32 has the through-hole portion 412c for exposing a part of the electret substrate 110 included in the electrostatic motor 200. It is preferred that the through-hole portion 412c have a shape conforming to a shape of the through-hole portion 323 of the dial 32. With the arrangement described above, the user can view the electret substrate 110 from the outside.

Further, the watch 1 has been described in this embodiment. However, the watch is not limited to the wristwatch as long as it includes at least the electrostatic motor 200, and may be another timepiece. Further, the watch 1 is not limited to an electronic watch, and may also be a mechanical watch.

Further, in the embodiment and each of the modification examples, the arrangement of the counter substrates on both sides of each of the electret substrates 110 has been described. However, the counter substrate may be arranged on only one side of each of the electret substrates 110. Specifically, for example, only the counter substrate 120 may be provided without the counter substrate 130 illustrated in FIG. 4 in this embodiment. In this case, it is preferred that the electret films 111 be provided only on the surface of each of the electret substrates 110, which is opposed to the counter substrate 120.

It is preferred that the ground spring 420 be provided so as to avoid overlapping with an oscillation locus of the oscillating weight 15 in plan view. For example, as illustrated in FIG. 2, it is preferred that the ground spring 420 be arranged on an outer side of the oscillation locus of the oscillating weight 15 in plan view. With the configuration described above, the ground spring 420 can be electrically continuous with the case back 312 without interference with the oscillating weight 15.

In the above, the embodiment according to the present invention is described. However, the specific configurations described in the embodiment are described as examples, and are not intended to limit the technical scope of the present invention to the embodiment. Various modifications may be made by a person skilled in the art to the disclosed embodiment. It is to be understood that the technical scope of the invention disclosed herein covers all such modifications.

What is claimed is:

1. A timepiece, comprising:
an exterior case having electroconductivity;
an operating member having electroconductivity, which is inserted into the exterior case through an opening formed through the exterior case, and which is configured to accept an operation performed by a user;
an electrostatic induction type converter including:
an electret substrate having an electret surface on which electret films being electrically charged are provided;
a counter substrate, on which electrodes to be arranged so as to be opposed to the electret films are provided; and
a rotary shaft configured to rotate the electret substrate and the counter substrate relative to each other; and
a battery,
wherein the operating member and the exterior case are electrically continuous with each other via a conduction path formed so as to avoid overlapping with the electret surface in a plan view,
wherein the battery is arranged so as to avoid overlapping with the electret surface in the plan view,
wherein the rotary shaft and the battery are respectively arranged in different regions among four regions defined by a first straight line for connecting a twelve o'clock position and a six o'clock position and a second straight line for connecting a three o'clock position and a nine o'clock position in the plan view.

2. The timepiece according to claim 1, further comprising:
a clock circuit board on which a control circuit having a time measurement function is mounted; and
a conductive member configured to allow conduction between the clock circuit board and the exterior case.

3. The timepiece according to claim 2,
wherein the conduction path passes through the clock circuit board, and
wherein the clock circuit board is arranged so as to avoid overlapping with the electret surface in the plan view.

4. The timepiece according to claim 2, further comprising:
a member, which is provided on a part of the conduction path, which allows conduction between the operating member and the clock circuit board, and has a posture to be displaced along with the operation of the operation member, which is performed by a user,
wherein the member is arranged so as to avoid overlapping with the electret surface in the plan view.

5. The timepiece according to claim 2, wherein the clock circuit board has a cutout formed so as to avoid covering the electret surface in the plan view.

6. The timepiece according to claim 1, further comprising:
a wheel train configured to operate in association with a member having a posture to be displaced in accordance with an operation of the operation member,
wherein the wheel train is arranged so as to avoid overlapping with the electret surface in the plan view.

7. The timepiece according to claim 1,
wherein the exterior case includes a case body and a case back, and
wherein the operating member is electrically continuous with the case back via the conduction path.

8. The timepiece according to claim 1, further comprising:
a main plate on which a clock circuit board assembled with a control circuit having a time measurement function is mounted,
a member having a posture to be displaced along with the operation of the operation member, which is performed by a user,
a positioning pin that supports the member so as to be rocked, and
a positioning member that positions the main plate with respect to the exterior case,
wherein the conduction path passes through the member, the positioning pin, the main plate, and the positioning member.

9. The timepiece according to claim 8, wherein the member is arranged so as to avoid overlapping with the electret surface in the plan view.

10. A timepiece, comprising:
an exterior case having electroconductivity;
an operating member having electroconductivity, which is inserted into the exterior case through an opening formed through the exterior case, and which is configured to accept an operation performed by a user;
an electrostatic induction type converter including:
an electret substrate having an electret surface on which electret films being electrically charged are provide;
a counter substrate, on which electrodes to be arranged so as to be opposed to the electret films are provided; and
a rotary shaft configured to rotate the electret substrate and the counter substrate relative to each other; and
a battery,
wherein the operating member and the exterior case are electrically continuous with each other via a conduction path formed so as to avoid overlapping with the electret surface in a plan view,
wherein the electrostatic induction type converter comprises a plurality of electrostatic induction type converters, and
wherein at least the rotary shafts of the plurality of electrostatic induction type converters are respectively arranged in different regions among four regions defined by a first straight line for connecting a twelve o'clock position and a six o'clock position and a second straight line for connecting a three o'clock position and a nine o'clock position in the plan view.

11. A timepiece, comprising:
an exterior case having electroconductivity;
an operating member having electroconductivity, which is inserted into the exterior case through an opening formed through the exterior case, and which is configured to accept an operation performed by a user;
an electrostatic induction type converter including:
an electret substrate having an electret surface on which electret films being electrically charged are provide;

a counter substrate, on which electrodes to be arranged so as to be opposed to the electret films are provided; and a rotary shaft configured to rotate the electret substrate and the counter substrate relative to each other; and a battery, wherein the operating member and the exterior case are electrically continuous with each other via a conduction path formed so as to avoid overlapping with the electret surface in a plan view, wherein the electrostatic induction type converter comprises a driving device, wherein the electrostatic induction type converter comprises:

a plurality of electrostatic induction type converters, which include at least two electric power generating devices, and wherein at least the rotary shaft of the driving device and the rotary shafts of the electric power generating devices are respectively arranged in different regions among four regions defined by a first straight line for connecting a twelve o'clock position and a six o'clock position and a second straight line for connecting a three o'clock position and a nine o'clock position in the plan view.

12. The timepiece according to claim 11, further comprising:

an oscillating weight configured to be rotated in accordance with a posture of the timepiece and transmit a rotation amount of the oscillating weight to the electret substrate of each of the electric power generating devices; and a conductive member, which is arranged so as to avoid overlapping with an oscillation locus of the oscillating weight in the plan view and is electrically continuous with the exterior case on the conduction path.

13. The timepiece according to claim 11, wherein the operating member and the rotary shaft of the driving device are respectively arranged in two different regions defined by a straight line for connecting a twelve o'clock position and a six o'clock position.

14. The timepiece according to claim 11, further comprising a hand, wherein the driving device is configured to move the hand.

15. The timepiece according to claim 14, further comprising an electromagnetic motor, wherein the hand comprises at least a second hand, a minute hand, and an hour hand, wherein the electromagnetic motor is configured to move the minute hand and the hour hand, and wherein the driving device is configured to move the second hand.

16. The timepiece according to claim 15, wherein the electromagnetic motor includes a coil, and wherein the coil is arranged so as to avoid overlapping with the electret surface of the driving device in the plan view.

17. The timepiece according to claim 15, wherein a shortest distance between the driving device and the battery is larger than a shortest distance between the electromagnetic motor and the battery in the plan view.

* * * * *